US005831263A

United States Patent [19]
Komachiya et al.

[11] Patent Number: 5,831,263
[45] Date of Patent: *Nov. 3, 1998

[54] IN-CYLINDER PRESSURE SENSING APPARATUS FOR MULTI-CYLINDER ENGINE

[75] Inventors: Masahiro Komachiya, Hitachi; Shigeru Oho, Hitachinaka; Satoshi Shimada, Hitachi; Seiko Suzuki, Hitachiota; Masahiro Kurita, Hitachinaka; Terumi Nakazawa, Ibaraki-ken; Takao Sasayama, Hitachi, all of Japan

[73] Assignee: Hitachi, Ltd., Tokyo, Japan

[*] Notice: The term of this patent shall not extend beyond the expiration date of Pat. No. 5,693,936.

[21] Appl. No.: 548,755

[22] Filed: Oct. 26, 1995

Related U.S. Application Data

[63] Continuation-in-part of Ser. No. 233,749, Apr. 26, 1994, Pat. No. 5,693,936.

[30] Foreign Application Priority Data

Oct. 26, 1994 [JP] Japan .................................... 6-262188
Oct. 26, 1994 [JP] Japan .................................... 6-262189

[51] Int. Cl.⁶ .................................................... H01T 5/16
[52] U.S. Cl. ........................................ 250/227.17; 73/705
[58] Field of Search ........................ 250/227.14, 227.16, 250/227.17, 231.19; 23/703, 715, 705

[56] References Cited

U.S. PATENT DOCUMENTS

| 4,438,647 | 3/1984 | Ozaki et al. ............................ 73/117.3 |
| 4,727,254 | 2/1988 | Wlodarczyk ............................. 250/338 |
| 4,734,577 | 3/1988 | Szuchy ..................................... 356/32 |
| 4,846,547 | 7/1989 | Falco et al. ........................... 350/96.29 |
| 5,067,815 | 11/1991 | Kotrotsios et al. ..................... 356/345 |
| 5,093,569 | 3/1992 | Krumboltz et al. ............... 250/227.16 |
| 5,317,147 | 5/1994 | Dandliker et al. ................. 250/227.17 |
| 5,380,014 | 1/1995 | Schaperkotter ............................ 277/2 |

FOREIGN PATENT DOCUMENTS

| 41 03 327 A1 | 10/1992 | Germany . |
| A-58-66031 | 4/1983 | Japan . |
| A-60-166739 | 8/1985 | Japan . |
| A-2-157631 | 6/1990 | Japan . |
| A-4-335127 | 11/1992 | Japan . |

*Primary Examiner*—Stephone B. Allen
*Attorney, Agent, or Firm*—Antonelli, Terry, Stout & Kraus, LLP

[57] ABSTRACT

An in-cylinder pressure sensing apparatus for a multi-cylinder engine has a plurality of sensing parts packaged between a cylinder head and a cylinder block of an engine having a plurality of cylinders and being operative to detect a signal indicative of an internal pressure of each of the plurality of cylinders. A detection circuit is provided for connecting the sensing parts in series and for overlapping detection signals obtained from the individual sensing parts to take out a resulting overlapped signal. A reference signal generator operates to supply a reference signal for separating detection signals corresponding to the individual cylinders from the overlapped signal. A unit is also provided for separating the detection signals, detected in accordance with pressures of the individual cylinders, from the overlapped signal on the basis of the reference signal.

33 Claims, 18 Drawing Sheets

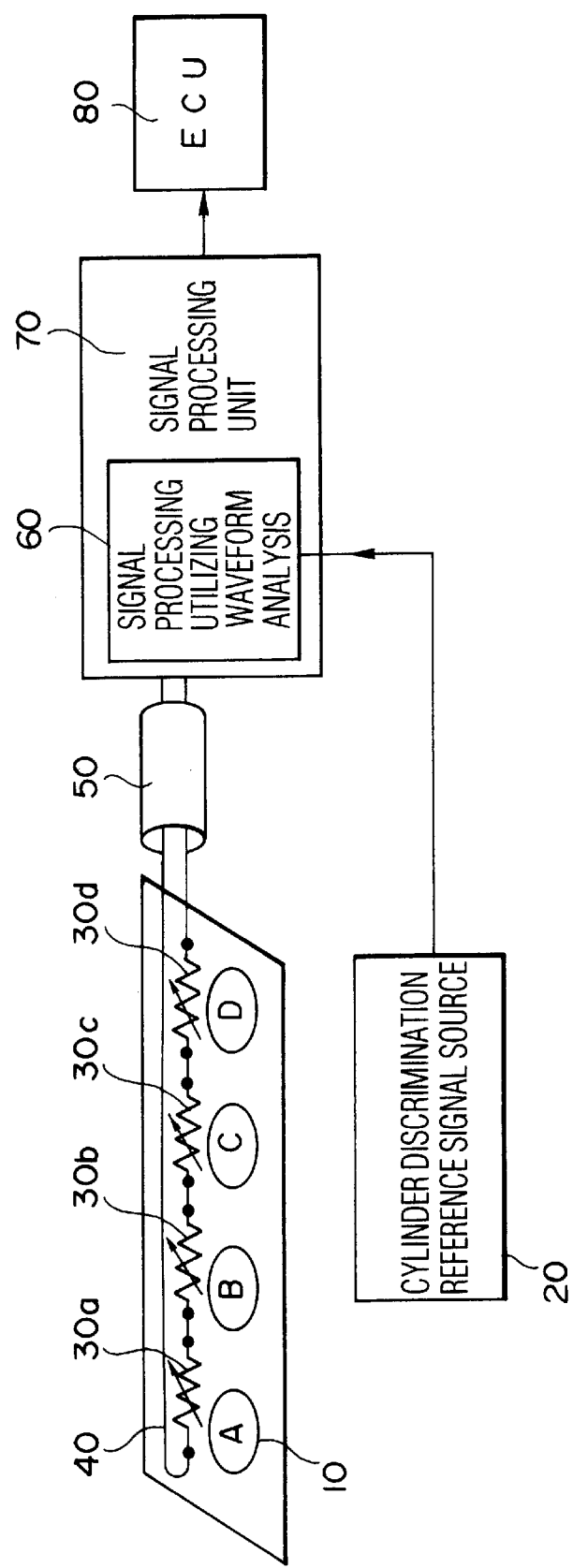

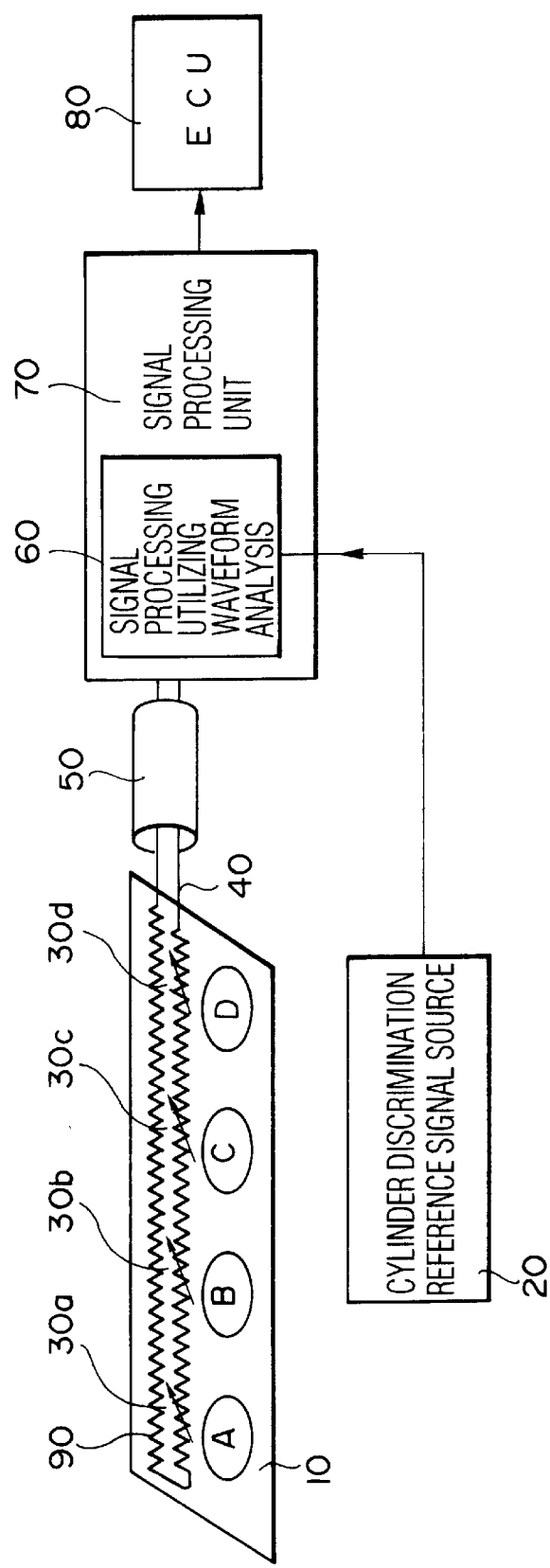

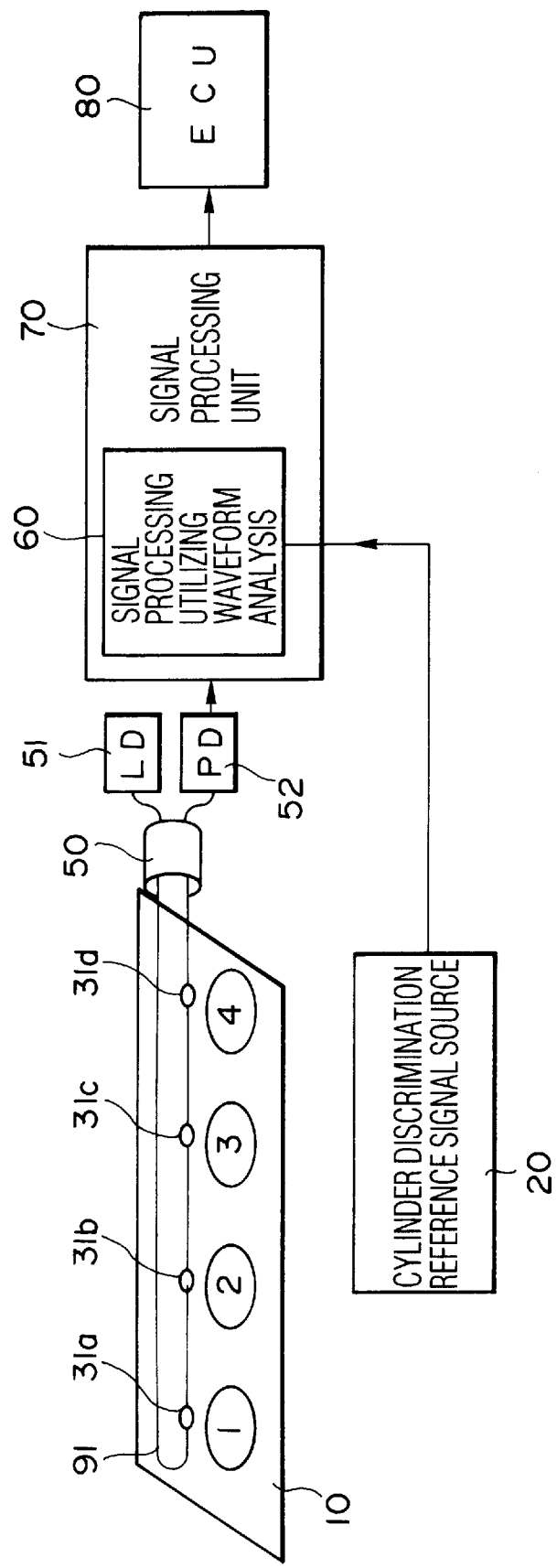

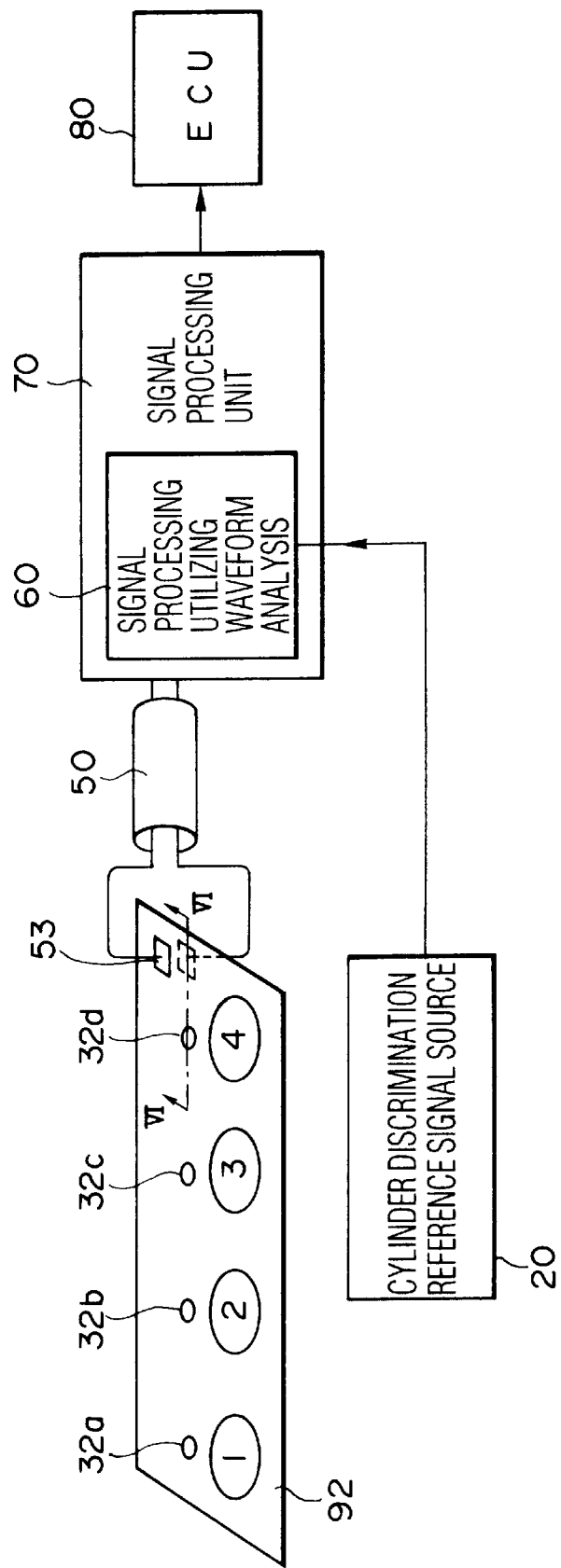

IN-CYLINDER PRESSURE SENSING APPARATUS FOR MULTI-CYLINDER ENGINE

CROSS-REFERENCE TO RELATED APPLICATION

This application is a continuation-in-part of U.S. application Ser. No. 233,749, now U.S. Pat. No. 5,693,936 filed Apr. 26, 1994, the disclosure of which is hereby incorporated by reference.

BACKGROUND OF THE INVENTION

The present invention relates to in-cylinder pressure sensing for a multi-cylinder engine carried out to control the engine.

In-cylinder pressure sensors utilizing the piezoelectric effect or the piezoresistance effect are presently available for control of car engines.

A pressure sensing apparatus disclosed in JP-A-4-335127 is a known technique for applying the in-cylinder pressure sensor to in-cylinder pressure measurement for a multi-cylinder engine. When viewed from the standpoint of packaging of the pressure sensor, the above apparatus uses a plurality of pressure sensors and output signal wiring lines from the individual sensors are taken out of the engine independently of each other. When this type of apparatus is applied to an engine having many cylinders, for example, a six-cylinder engine, the number of necessary sensors increases to make it difficult to maintain sites for mounting the sensors. At the same time, signal wiring to be laid in the neighborhood of the engine becomes complicated.

An in-cylinder pressure sensing apparatus disclosed in JP-A-58-66031 is another known technique. In this case, changes in pressures received by a plurality of sensing parts are transmitted to a pressure sensor via a pressure transmission tube filled with incompressible fluid and therefore, electrical signal wiring taken out of the sensor can be simplified. On the other hand, from the viewpoint of expansion of volume of the internal fluid, the pressure transmission tube is sensitive to a change in temperature. Accordingly, for accurate measurement, signal wiring lines from the individual sensing parts, i.e., the pressure transmission tube must be arranged externally of the engine.

Further, an in-cylinder pressure sensor disclosed in JP-A-2-157631 is still another known technique. In this case, piezoelectric sensing elements and a main part of signal wiring lines taken out of the individual elements are packaged within an engine head gasket and therefore, main signal wiring lines from the plurality of sensors do not become exposed to the outside of an engine. In other words, signal wiring in the neighborhood of the engine can be simplified considerably. However, since the plurality of sensors identical in number to the cylinder number are used, four systems of signal wiring in conformity with measurement at the individual four cylinders are needed. Further, the number of signal wiring lines taken out of the engine increases with the number of cylinders. The mandatory increase of the wiring line number in proportion to the cylinder number results in an increase in weight of wire and the like. In addition, a thick cable is consequently connected to a thin gasket surface and strength of connection must particularly be taken into consideration.

In general in-cylinder pressure measuring techniques, an optical sensing method has been proposed in addition to the electrical sensing method. For example, a control apparatus disclosed in JP-A-60-166739 is still another known technique. In this known example, since multiplexed transmission of signals using an optical fiber interconnecting in-cylinder pressure sensing parts is carried out, the structure of sensing parts need not be changed extensively even for in-cylinder pressure sensing for multi-cylinder engines and signal wiring can be prevented from becoming complicated. A loss of information (necessary for deciding which cylinder an obtained signal is associated with) due to a decrease in signal wiring can be compensated by a cylinder discrimination mechanism based on an output of a sensor for reference such as a crank angle sensor. However, signal wiring lines from the individual sensing parts, i.e., optical fibers are laid in the neighborhood of the engine. Generally, the optical fiber is an insulator, having thin diameter, light weight and enjoying easiness of wiring even in an complicated ambience around the engine. However, when the optical fiber wiring is laid externally of the engine, the optical fiber must be handled very carefully so as not to be broken during packaging work. Also, in this known example, the output from the cylinder discrimination mechanism is fed back to control a light emitter for emitting light incident on the optical fiber and hence a constituent element represented by an oscillator must be added to the cylinder discrimination mechanism. When taking into account the number of system constituting components including the optical fiber wiring laid in the neighborhood of the engine and the oscillator, the apparatus construction as a whole cannot always be said to be advantageous to packaging.

The neighborhood of the actual engine is complicated and therefore, in order to realize an engine control system based on simultaneous measurement of multi-cylinder internal pressure, it is necessary that the sensor construction be simplified sensing part by sensing part and signal wiring lines taken from individual sensing parts to the neighborhood of the engine also be simplified.

An electric type sensor utilizing the piezoelectric effect or the piezoresistance effect is mainly used as an in-cylinder pressure sensor for controlling car engines. Contrary to this, an optical sensor, especially, an in-cylinder pressure sensor using an optical fiber which is immune from electrical noise and easy to package into the complicated neighborhood of an engine has been proposed. As an example, one may refer to a control apparatus disclosed in JP-A-60-166739. In the apparatus, an optical fiber is laid in the neighborhood of the engine and part of the optical fiber passes through a case for pressure detection prepared at the position of a washer of a bolt. Generally, the optical fiber is an insulator and so it can pass through a gap in the neighborhood of the engine without suffering from a danger of short circuit. On the other hand, in an example disclosed in DE4103327A1 where an optical fiber is packaged, together with pressure sensing parts, within the engine, most of the optical fiber is particularly packaged, with pressure sensing parts provided for individual cylinders, within an engine head gasket. In this case, there is no need of forming holes for sensor packaging in the engine body, making it easy to package a plurality of pressure sensing parts for multi-cylinder pressure measurement into the engine. Since the optical fiber interconnecting the sensing parts is packaged in the gasket, breakage of the optical fiber will not be caused during packaging and operation. In each pressure receiving part, a "local bend" in accordance with an internal pressure is applied to the optical fiber. As a result of a loss of the optical power due to the "local bend", the ability of the optical fiber to propagate light power changes and conversely, a change in internal pressure can be detected from a change in the light power. By adjusting the optical fiber internal structure and selecting the wavelength of incident light, the change in the light power can be so adjusted as to be sufficiently large for sensing. Through this, even when the optical fiber is affected by external disturbance such as fluctuations and vibrations, steady sensor operation can be ensured.

The above in-cylinder pressure sensor having the optical fiber packaged within the gasket is required to have the ability to work satisfactorily with many various kinds of gaskets. Wiring of the optical fiber in the gasket and electrical wiring to be laid externally of the gasket must be simplified. Simplification of the wiring in the gasket is a necessary condition for permitting packaging which does not depend on differences in gasket structure and simplification of the wiring external of the gasket is a necessary condition for providing a novel sensor in a complicated engine surroundings.

More specifically, when a light emitter and a light receiver are packaged on the same side of the gasket, wiring lines necessary for the light emitter and the light receiver can collectively be taken out of the engine, thus simplifying the wiring external of the engine. However, the optical fiber in the gasket must be laid to take a route other than its wiring laid through the pressure receiving parts. Holes are formed in the gasket for cooling water and other holes are provided for tightening bolts at various sites. The wiring of the optical fiber in the gasket is desired to be so laid as to avoid these holes and so the shorter the necessary optical fiber wiring, the easier the gasket working becomes, thereby making it easy to package the optical fiber into various types of different gaskets. Thus, in some of the above prior arts, the optical fiber wiring in the gasket is so selected as to take a short route interconnecting a plurality of pressure receiving parts, thereby simplifying the wiring in the gasket. In this case, however, the light emitter and the light receiver are consequently disposed so as to be positioned remotely from each other. Accordingly, it is difficult to compactly and collectively handle the electrical wiring for connecting the light emitter and receiver to the outside of the engine. Usually, parts, auxiliary devices and wiring are complicatedly laid in the neighborhood of the engine. Therefore, when a sensor is newly mounted, the sensor structure in which additional wiring is not required is obviously more advantageous in assembling the sensor and applying the sensor to various kinds of engines.

SUMMARY OF THE INVENTION

An object of the present invention is to provide an in-cylinder pressure sensing apparatus for a multi-cylinder engine in which sensing parts for sensing internal pressures of a plurality of engine cylinders and wiring lines for transmitting signals from the sensing parts are simplified so as to facilitate packaging of the in-cylinder pressure sensing apparatus for the multi-cylinder engine into the engine.

Another object of the present invention is to provide an in-cylinder pressure sensing apparatus for multi-cylinder engine in which an optical fiber is especially used for sensing internal pressures of the engine cylinders and the optical fiber is laid on a short route and simplified.

In the light of the above objects, according to one aspect of the present invention, an in-cylinder pressure sensing apparatus for a multi-cylinder engine comprises an in-cylinder pressure sensor having a plurality of sensing parts packaged within an engine gasket and being capable of measuring internal pressures of the individual cylinders to provide detection signals which are overlapped and delivered in the form of an overlapped signal, a reference signal generator for supplying a reference signal for separation of the overlapped signal, and a signal processor operative to perform a signal separation procedure for separating a part or a whole of changes in internal pressures of the individual cylinders from the overlapped signal on the basis of the output of the in-cylinder pressure sensor and the output of the reference signal generator.

In the in-cylinder pressure sensor according to the present invention and an engine control system using the sensor, the in-cylinder pressure sensor is formed of a distributed sensing material for multi-point pressure measurement such as a wire with electric resistance, pressure sensitive conducting rubber, a carbon pile or an optical fiber, and at least part of signals from the individual sensing parts are collectively taken out in the form of an overlapped signal, thereby decreasing the number of signal wiring lines necessary for the neighborhood of the sensing parts.

In packaging to the engine, the sensing material along with the peripheral signal wiring is packaged integrally with a member between the engine cylinder head and the cylinder block, especially, a head gasket, so that packaging of the in-cylinder pressure sensor for multi-cylinder pressure measurement can be facilitated regardless of whether a condition exists in the engine neighborhood such that space for sensor packaging would be difficult to find and maintain.

Further, the above separation of the overlapped signal is carried out in a software fashion by using in combination the source of reference signal for cylinder discrimination and the signal processing unit for signal processing utilizing a waveform analysis, so that selection and change of detection information in question can be dealt with without changing the apparatus construction directly affecting the packaging.

In the in-cylinder pressure sensor of the present invention and the engine control system using the sensor, signals from the plurality of sensing parts can be taken out collectively through a decreased number of signal wiring lines and thereafter can be separated through the signal processing, thereby facilitating the engine control based on the multi-cylinder pressure measurement.

According to another aspect of the present invention, an in-cylinder pressure sensing apparatus for a multi-cylinder engine is constructed such that an end surface for light reflection is formed at one end of an optical fiber, light emitted from a light source is incident on the other end, and the light reflected at the end surface is again returned to the other end so as to be detected by a light receiving device, wherein the optical fiber is packaged within a gasket of an engine, internal pressures of the plurality of engine cylinders are detected in the form of an overlapped signal made up of signals obtained from the individual cylinders, and the overlapped signal is separated into the signals from the individual cylinders on the basis of a reference signal.

In a gasket incorporating a fiber-optic cylinder pressure sensor, the end of an optical fiber on which light is incident is also used as a detection end by utilizing reflection of light. A light emitter and a light receiver are packaged close to each other, so that electrical wiring connected to the outside of the engine can be simplified and at the same time, unwanted optical fiber wiring in the gasket can be dispensed with. As a result, a fiber-optic cylinder pressure sensing apparatus for multi-cylinder pressure measurement easily applicable to various kinds of engines and various kinds of gaskets can be provided.

BRIEF DESCRIPTION OF THE DRAWINGS

FIG. 1 is a diagram showing the circuit construction of an in-cylinder pressure sensor according to a first embodiment of the present invention.

FIG. 2 is a diagram showing the circuit construction of an in-cylinder pressure sensor according to a second embodiment of the present invention.

FIG. 3 is a diagram showing the circuit construction of an in-cylinder pressure sensor according to a third embodiment of the present invention.

FIG. 5 is a diagram showing an in-cylinder pressure sensor according to a fourth embodiment of the present invention.

DESCRIPTION OF THE PREFERRED EMBODIMENTS

Figures 4A, 4B:
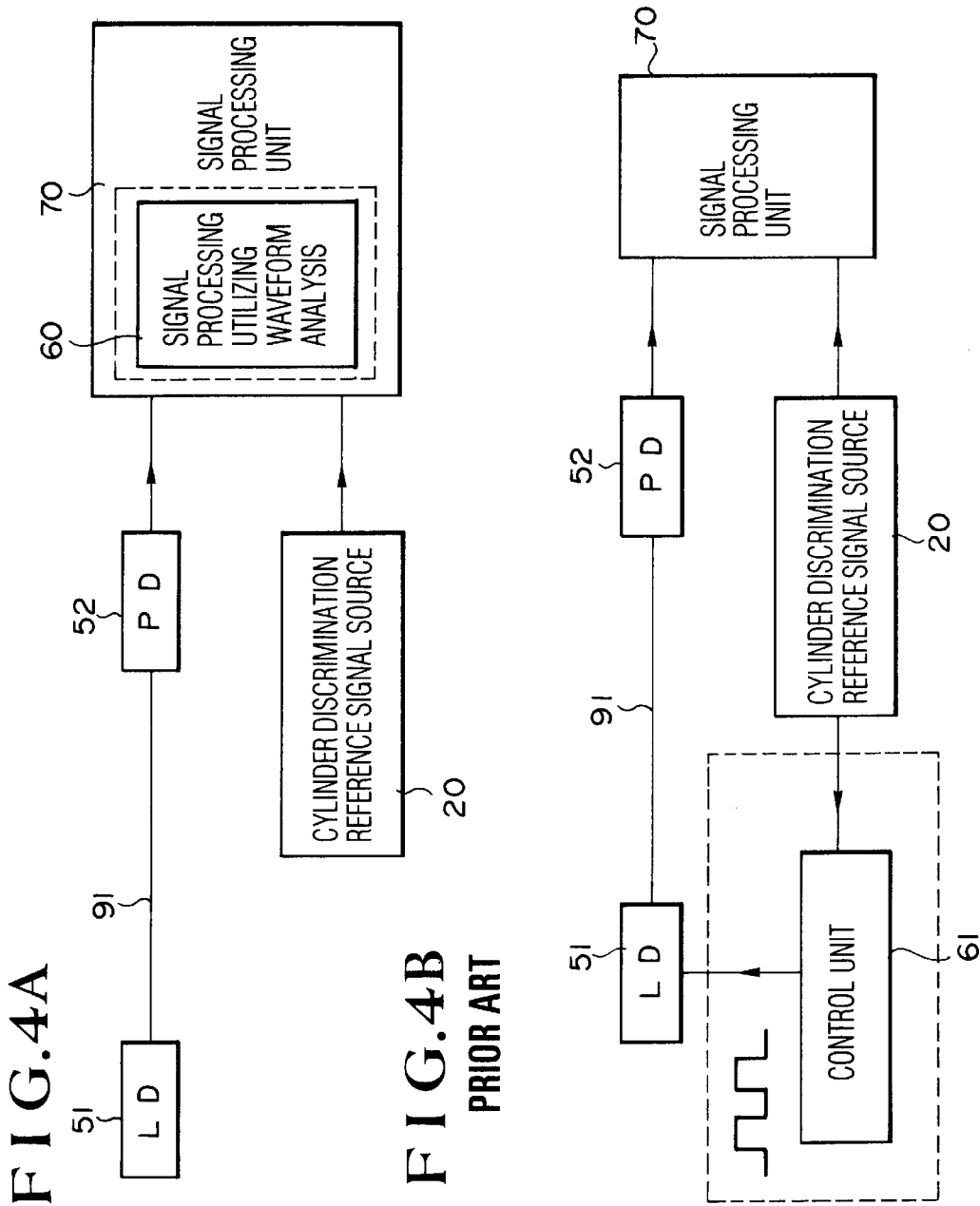
FIGS. 4A and 4B are diagrams for comparative explanation of differences between the signal processing method in the third embodiment of the present invention and that in the known technique.

The present invention will now be described by way of example with reference to the accompanying drawings.

Referring to FIG. 1, there is illustrated a first embodiment of the present invention. In the figure, reference numeral 10 designates an engine head gasket per se or a plate-like structure (sensing layer) which can be packaged between a cylinder block and a cylinder head while overlapping with the head gasket. The sensing layer can be made of, for example, a carbon like seal material which is a principal material constituting the gasket or can be formed of a metal plate. Sensing parts 30a, 30b, 30c and 30d provided for measurement of internal pressure of the individual four cylinders are each formed of a metal strain gauge (wire with electric resistance) whose electric resistance changes with a change in pressure. The strain gauge is housed in a tube of an elastic insulative material. An internal pressure of a corresponding cylinder is introduced to each sensing part which in turn is allowed to detect a change in in-cylinder pressure through a suitable pressure transmission mechanism. The sensing parts are connected in series with a signal transmission line standing for an electrical signal line 40 and an external signal wiring line passes through a cable 50 so as to be led to a signal processing unit 70. Since the sensing parts are connected in series, individual internal pressure signals take the form of an overlapped signal which is transmitted to the signal processing unit 70. Incidentally, in the case of a four-cylinder engine, combustion takes place in individual cylinders at different timings and the order of cylinders to be placed in combustion is predetermined. Therefore, changes in internal pressures of individual cylinders which occur centrally of a combustion peak in each cylinder can be separately measured from the overlapped signal on the basis of a reference signal such as a trigger of fuel-injection, trigger of ignition or crank angle sensor output of a representative cylinder or a rotation angle signal of a gear operable to 360° rotate during one cycle of combustion in accordance with crank rotation. Further, it will be possible by using signal processing, such as a theoretical prediction of an internal pressure waveform, to separately detect all the changes in internal pressures of a specified cylinder. As shown in FIG. 1, the reference signal is supplied from a cylinder discrimination reference signal source 20 and the processing for separation of changes in internal pressures of the individual cylinders is carried out in a means 60 for signal processing for a waveform analysis. The cylinder discrimination reference signal source 20 can be constructed by combing more than two reference signal sources. For example, by using the trigger of fuel-injection and crank angle sensor, changes in internal pressures of the individual cylinders can be specified separately on crank rotation angle in order of combustion starting from the representative cylinder. (Only the use of conventional crank angle sensor is not enough to unique separation of the combustion timing of individual cylinder.) A result of processing by the signal processing unit 70 is sent to an engine control unit 80 so as to be reflected in engine control based on the conventionally known method.

When the number of cylinders to be measured increases from four, combustion occurs at the same timing or nearly equal timing in some of the cylinders and obviously, for separation of signals, one system or a line of signal wiring including four sensing parts or sensing parts more than four as above becomes insufficient and two or more systems of signal wiring are required. But the number of the signal wiring systems need not be changed in proportion to the number of cylinders and even the general multi-cylinder pressure measurement can be dealt with flexibly by merely making a slight change in hardware.

In the above embodiment, the plurality of sensing parts 30a to 30d, together with the electrical signal line 40, are collectively packaged within the gasket or the similar plate-like structure (sensing layer) shown in FIG. 1 and hence, regardless of the complicated engine surroundings, the packaging of the sensor necessary for cylinder independent combustion control of the multi-cylinder engine and the signal wiring between the sensing parts can be ensured. Through this, the number of signal wiring lines external of the engine can be decreased and therefore, not only assembly of the engine can be facilitated but also problems during operation, such as breakage of wire, can be prevented.

In the above embodiment, detection signals from the individual sensing parts are collectively taken out in the form of an overlapped signal and thereafter, the overlapped signal is separated in a software fashion. In other words, the distributed multisensing parts 30a to 30d, consecutively disposed, are used in place of a plurality of independent sensors to simplify the signal wiring around the engine, and the simplified signal wiring is on the other hand compensated by the signal processing. With the signal wiring required for the engine simplified, packaging of the sensing parts within a narrow portion, for example, within the gasket can be facilitated. Also, the outer diameter of the external signal cable 50 can be decreased in accordance with the reduction in the number of signal wiring lines. This ensures that physical connection of the external cable to the gasket of about 1 mm thickness can facilitated and steadily strengthened.

Figure 11:
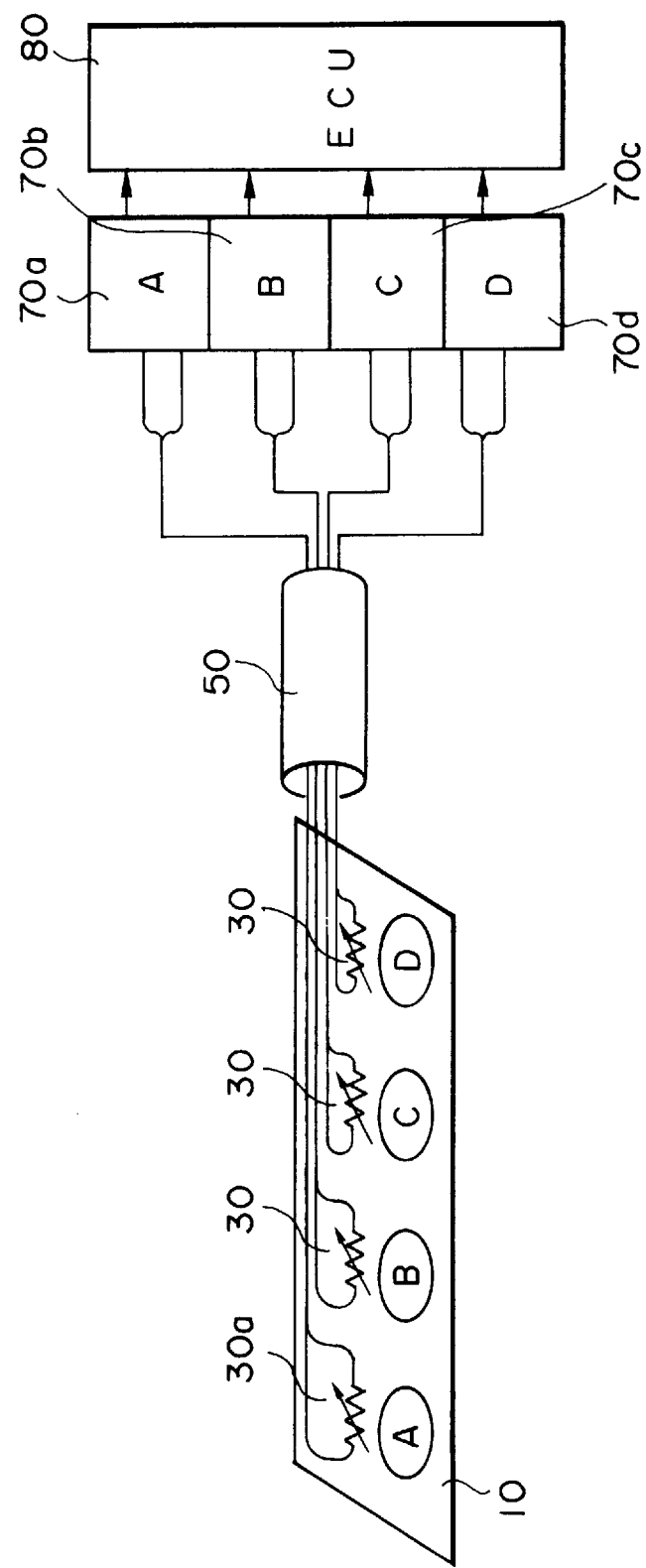
FIG. 11 is a diagram showing the circuit construction of sensing parts in the prior art relevant to the present invention.

For the purpose of comparison, a conventional example of general packaging of sensors within a gasket is shown in FIG. 11. In this case, the signal wiring inside the gasket is complicated and the degree of freedom is impaired in maintaining a plurality of sensing parts. In addition, the outer diameter of the external cable increases with the increase in the number of signal wiring lines and consequently, connection of the external cable, which is stable in strength, to such a thin plate-like structure as the gasket is generally difficult to achieve. Of course, external signal wiring lines may not be bundled to a cable form so as to permit unforced connection of individual wiring lines. In this case, however, the external signal wiring becomes inevitably complicated.

In FIG. 11, signals from the individual sensing parts are originally separated from each other and a mechanism corresponding to the cylinder discrimination reference signal source 20 is not required. Contrary to this, the present invention requires the cylinder discrimination reference signal source 20 newly added for separation of an overlapped signal and it may appear that the signal wiring is simplified but complexity of hardware around the engine remains unchanged as a whole. But, as described previously, part of the existing engine system such as trigger of injection can be utilized directly as the cylinder discrimination reference signal source 20. Thus, in maintaining the cylinder discrimination reference signal source 20 required for the separation processing of the collectively taken-out detection signals, change of hardware or addition of hardware which makes the packaging to the engine difficult is not always required.

Referring now to FIG. 2, there is illustrated a second embodiment of the present invention. In the present embodiment, a metal wire 90 standing for a signal transmission line within a gasket 10 is made of the same material as that of a plurality of sensing parts 30a to 30d. Namely, a metal material such as a wire with electric resistance whose electric resistance changes with a change in pressure is used without alternation as the signal transmission line. Like the first embodiment of the present invention, distributed multisensing parts, disposed consecutively, are used but in the present embodiment, the distributed sensing material itself is used as the signal transmission line in order that electrical connection can be dispensed with between the signal transmission line and the multisensing parts. By eliminating structurally weak connecting portions of signal wiring from the engine interior apt to reach a relatively high temperature, stable system operation can be expected for a long period of time.

Since the gasket 10 serves as a protective member for the signal transmission line 90, surplus external forces are not applied to the signal transmission line 90. On the other hand, part of the signal transmission line which is external of the gasket 10 is expected to be affected by external disturbance such as bend or vibration. Accordingly, in FIG. 2, the signal wiring line external of the engine is replaced with a usual electrical signal line 40 which is not pressure sensitive. In the case where the influence of external disturbance upon the signal line external of the gasket can be reduced by the protection effect of a cable 50, the whole of the signal wiring connected to a signal processing unit 70 can be made of the same material as that of the sensing parts 30a to 30d, eliminating connection portions in the signal wiring.

Referring now to FIG. 3, there is illustrated a third embodiment of the present invention. In the present embodiment, sensing parts and a signal transmission line, both laid within a gasket 10, are formed of an optical fiber 91 which is pressure sensitive. Light emitted from a light source 51 and incident on the optical fiber 91 propagates through the optical fiber. A light receiving unit 52 detects optical power (intensity of light) of the light passing through the optical fiber. Although not illustrated, the optical fiber is so designed as to receive "local bends" corresponding to internal pressures of individual cylinders at sensing parts 31a, 31b, 31c and 31d as disclosed in the parent application of the present application. When the optical fiber is uniformly bent, a loss of light power corresponding to an amount of bend (bend radius) of the optical fiber is generated in the optical fiber and as a result, optical power received by the light receiving unit 52 changes with an internal pressure received by each sensing part. Accordingly, an overlapped signal indicative of internal pressures of the individual cylinders can be detected from the total quantity of light passing through the optical fiber 91. When changes in the quantities of light passing through individual sensing parts are indicated in decibel (dB), the overlapped signal corresponds to a linear combination of the changes in the quantities of light. By noticing the difference in combustion cycle among individual cylinders, a principal part of a change in internal pressure of each cylinder can be separated from the overlapped signal by means of a cylinder discrimination reference signal source 20 and a signal processing unit 60 utilizing a waveform analysis. In the present embodiment, since the optical fiber which is an insulator is used for the sensing parts and the signal transmission line, the sensor can be packaged within the head gasket while steady insulation between the sensor and each of the cylinder head and cylinder block can be ensured regardless of the form of packaging. The sensor is not affected by the electromagnetic noise induced by the spark plug, so that highly accurate signal detection can be permitted when the sensor is packaged to the interior of the engine.

The separation procedure for an overlapped signal in the third embodiment of the present invention is shown in FIG. 4A and will be described in comparison with the separation procedure for an overlapped signal disclosed in JP-A-60-166739 and shown in FIG. 4B. For packaging of optical fiber 91, the above two examples differs from each other in that the optical fiber is packaged within a member corresponding to the gasket in the former example but the optical fiber is packaged to a spark plug clamping member in the latter. In the embodiment of the present invention, the signal processing unit 60 utilizing a waveform analysis picks up necessary information from the whole of an obtained signal waveform. Overlapping of internal pressure signals of the individual cylinders depends on the rotation speed and combustion state of the engine. For example, as compared to a large increase or decrease in internal pressure due to explosion during combustion, the internal pressure occurring during cranking upon start assumes a slight increase or decrease in accordance with piston motion, making the influence of waveform overlapping observed in the overlapped signal small, and therefore one can easily find the signal level of atmosphere pressure or the level of standard pressure utilizing the timing when both inlet and exhaust valves open. As an example, a waveform during cranking is captured immediately after key-in to save a necessary standard level in a memory so that even when overlapping of adjacent waveforms during high-speed rotation prevents the standard level from being discriminated, the signal detected during key-in may be used for compensation. Thus, in the signal processing based on the whole of the overlapped signal waveform, selection of detection information in accordance with the engine operation can be permitted. The analogue gate signal in FIG. 4B is replaced by a software gate or sampling process in FIG. 4A. Therefore, a flexible and rapid change of the gate time is available in FIG. 4A.

When a plurality of optical fiber wiring systems are used by, for example, providing two optical fiber systems for a four-cylinder engine and obtaining an overlapped signal from a set of two cylinders, the influence of overlapping of waveforms can of course be decreased to a great extent. In this case, in-cylinder pressure in the intake process of fuel (the pressure taking a minus value compared with the pressure of atmosphere) can be specified and the reference pressure corresponding to atmosphere pressure can be determined accurately.

On the other hand, in the prior art shown in FIG. 4B, combustion pressures in individual cylinders are separately detected by lighting the light source during a specified interval of time corresponding to each combustion peak. By noticing only a change in internal pressure which occurs near a combustion peak, spark timing control for each cylinder and misfiring detection can be carried out. In FIG. 4B, only a change in internal pressure near a combustion peak is originally picked up as a detection signal which in turn is delivered to a signal processing unit 70, thus simplifying the internal signal processing. Contrary to this, in the signal processing according to the present invention, the signal processing unit 60 utilizing a waveform analysis causes a consecutive internal pressure overlapped signal to undergo a gating processing so that a waveform near a combustion peak in each cylinder may be obtained. Namely, the signal processing unit plays a role of a control unit 61 of FIG. 4B to perform an equivalent signal processing utilizing a waveform analysis in a fashion advantageous to packaging.

Referring now to FIG. 5, there is illustrated a fourth embodiment of the present invention. In the present embodiment, a sensing material 92, which is a distributed sensor for multipoint pressure measurement is constructed of a gasket which is made of a known pressure sensitive material such as conducting rubber or carbon pile. Silicone or fluorocarbon rubber and carbon materials have heat resistance. Therefore, for example, by forming either a member in which particles with electric conductivity (such as metal powders) are distributed in the heat resistant rubber or a laminar structure of carbon pile in which inter-carbon atom distance is selected suitably into a gasket shape through, for example, stamping, a sensor and gasket in combined use can be obtained which takes advantage of the freedom of shape deformation and has the seal effect and characteristics of the sensing material. In this type of distributed sensor for multipoint pressure measurement, sensing parts 32*a* to 32*d* can be arranged at desired sites suitable for packaging, and packaging of a sensor suitable for in-cylinder pressure measurement for a multi-cylinder engine can therefore be facilitated. Detection signals from individual sensing parts are taken out of a detection port 53 in the form of an electrical overlapped signal. As in the foregoing embodiments, internal pressures of the individual cylinders delivered as an overlapped signal are separated from each other by means of a signal processing unit 60 utilizing a waveform analysis. Conversely, through the use of the signal processing as above, various kinds of distributed sensors for multipoint pressure measurement advantageous to in-cylinder pressure measurement for multicylinder engine can be utilized as sensing materials.

Figure 6:
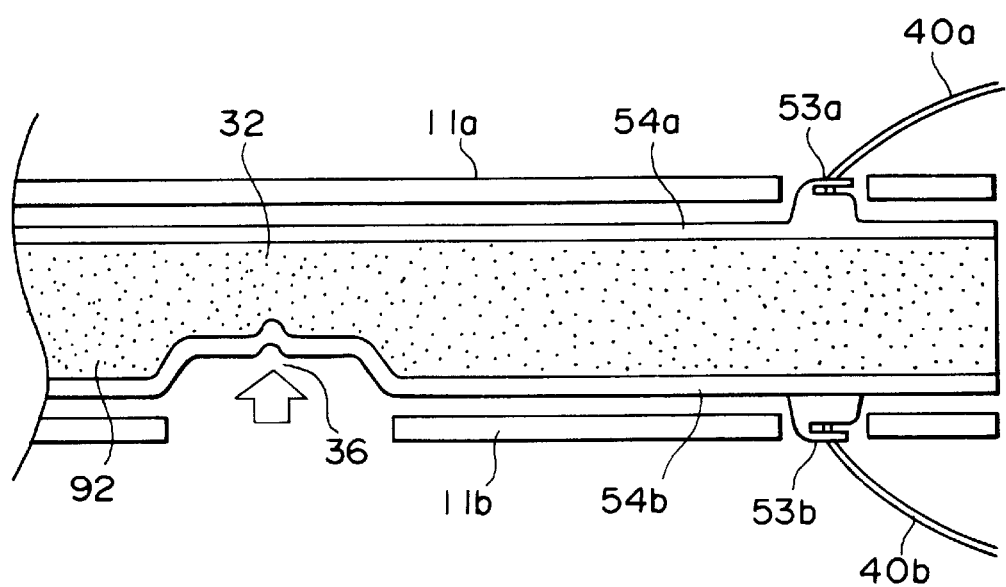
FIG. 6 is a sectional view taken on line VI—VI line of FIG. 5 to show a sensing part in the fourth embodiment of the present invention.

FIG. 6 is a sectional view taken along line VI—VI of FIG. 5, depicting a conduit 36 formed to extend vertically to the sheet of drawing so as to cause the interior of a cylinder to communicate with a sensing part, the conduit 36 terminating in the sensing part 32. Accordingly, in-cylinder pressure transmitted through the conduit 36 is applied upwards in a direction of arrow. In the figure, reference numeral 92 designates the distributed sensing material for multipoint pressure measurement, 54*a* and 54*b* film-like electrodes, 53*a* and 53*b* detection ports extending from the electrodes, and 11*a* and 11*b* insulating layers for electrically insulating the gasket from the cylinder head and the cylinder block.

Each of the insulating layers 11*a* and 11*b* has its contour which is so determined as to meet the shape of the gasket and is formed with a cylinder hole, a cooling water hole and a bolt hole at corresponding positions. The insulating layer is made of a material easy to deform or is made to have a thin film form, thereby securing the steady internal pressure seal effect. When insulating members in the form of a film are used, they can precedently be formed with ease on the surfaces of the gasket for sensing.

Although not illustrated, signal lines 40*a* and 40*b* taken out of the detection ports 53*a* and 53*b* are surrounded and covered with a protective member. Of course, by adjusting the arrangement of the film-like electrodes 11*a* and 11*b*, the detection ports 53*a* and 53*b* can be disposed on only one surface of the gasket. The signal lines 40*a* and 40*b* in the form of shield lines can be led to provide signal transmission immune from external disturbance.

An internal pressure of a cylinder to be measured is introduced to a lower part in the drawing, of the sensing part 32 through the conduit or pressure introduction hole 36 formed in the gasket at a site corresponding to, for example, a cylinder bore. As the internal pressure increases, the sensing part 32 pushes the sensing material 92 in the direction of arrow. Since the sensing material 92 contains particles with electric conductivity such as metal powders and carbon layers as described previously, the distance between particles with electric conductivity changes as the internal pressure increases to push the sensing material. By measuring a change in electric conductivity of the sensing material 92, a change in the internal pressure can be picked up. Metal powders as well as carbon atoms essentially behave as a group to change their inter-distance and so a consecutive signal change can be expected under the application of internal pressure. Like an ordinary diaphragm for pressure measurement, the size, the shape and the thickness of the sensing part 32 are so designed as to meet the sensitivity of the sensing material 92. For example, the sensing part 32 can be adjusted such that it can be displaced by a change in internal pressure by an amount which lies within a region of linear response of the sensing material 92. It is of course necessary that the internal structure of the sensing material 92 be determined so that optimum sensitivity of the sensor can be obtained when the engine is packaged.

Even when heat generated during engine combustion is transmitted to the sensing part 32, the heat can be sunk into the upper and lower surfaces of the gasket-like sensor, that is, into the engine cylinder head and engine block. When the thickness of each of the insulating members 11a and 11b is selected to be small or each insulating member has a film-like form, greater heat dissipation effect can be expected. Through this, thermal deterioration of the sensing material can be prevented.

Figure 7:
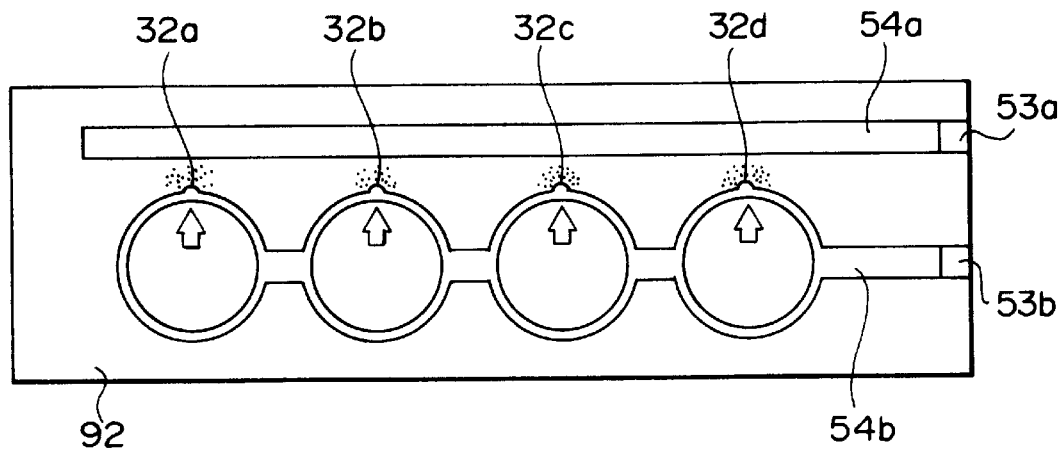
FIG. 7 is a diagram for explaining an in-cylinder pressure sensor according to a fifth embodiment of the present invention.

Referring now to FIG. 7, there is illustrated a fifth embodiment of the present invention. In the present embodiment, like the fourth embodiment of the present invention, the gasket per se is mainly constructed of a sensing material 92 of, for example, pressure sensitive rubber or carbon pile, and a change in shape of the gasket-like sensor is picked up in the direction of the surface. In this case, a metal portion of the bore grommet is used as a signal transmission line. In the figure, reference numeral 32a, 32b, 32c and 32d designate sensing parts associated with individual cylinders, 54a and 54b electrodes, and 53c and 53b ports for detection of signals from the electrodes. A projection provided for the sensing part is a pressure intensifier. When the sensing part 32 displaces in a cylinder radial direction in response to a change in internal pressure, the sensing material 92 associated with the sensing part 32 is deformed between the electrodes 54a and 54b to exhibit a change in electric conductivity. This change is detected to pick up the corresponding change in internal pressure. For example, on the assumption that the electric conductivity associated with each sensing part is proportional to an internal pressure of each cylinder, the whole of electric conductivities associated with the sensing parts 32a, 32b, 32c and 32d which are in parallel connection as viewed from the detection port is proportional to the sum of internal pressures. Like the first to fourth embodiments of the present invention, an overlapped internal pressure signal can be measured separately.

The electrodes 54a and 54b can be formed on the gasket surface through printing. Alternatively, they can be packaged within the gasket to have an increased contact area with the sensing material. The distribution of particles with electric conductivity contained in the sensing material 92 can be made to be locally dense to provide higher electric conductivity so that part of the sensing material 92 can be used as part of each of the electrodes 54a and 54b. During packaging, insulating members are disposed on the upper and lower surfaces of the gasket for sensing to provide electric insulation between the gasket and the cylinder head and cylinder block.

Figure 8:
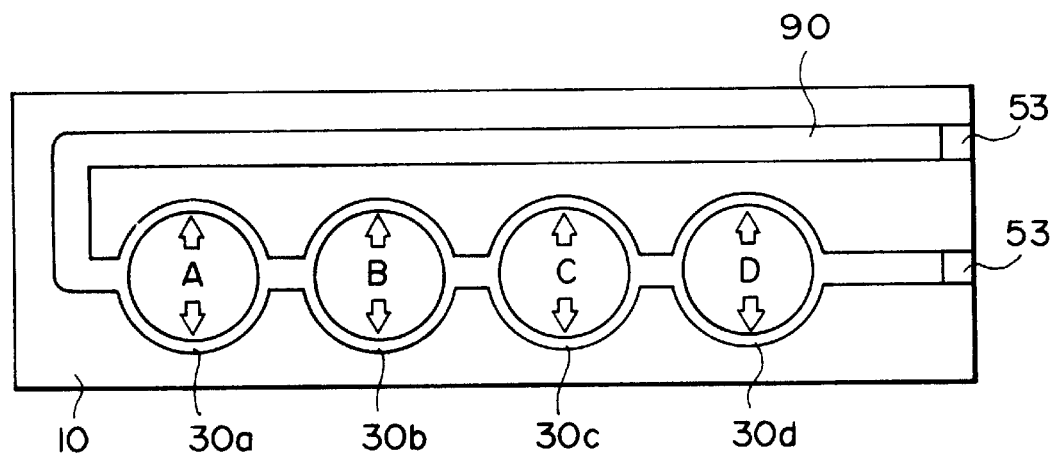
FIG. 8 is a diagram for explaining an in-cylinder pressure sensor according to a sixth embodiment of the present invention.

Referring to FIG. 8, there is illustrated a sixth embodiment of the present invention. In the present embodiment, the bore grommet per se constituting a gasket 10 is made of a metallic pressure sensitive material 30 to form pressure receiving parts. In the figure, reference numeral 90 designates a signal transmission line and 53 signal detection ports. As the internal pressure increases, the cylinder bore grommet is deformed in the radial direction and like the metal strain gauge, changes in electric resistance at a deformed portion. By detecting a change in electric resistance, a change in internal pressure can be picked up. The signal transmission line can be formed on the surface of the gasket through printing. In an alternative, the signal transmission line 90 can be of the same material as that of the sensing parts 30a to 30d can be formed integrally therewith. In an exemplary method for integral formation of the sensing parts 30a to 30d and the signal transmission line 90, four ring-shaped metal plates corresponding to the cylinder bores connected in cascade and the signal transmission line 90 are put together to form a U-shape on one surface of the gasket, and the four ring-shaped metal plates are not only deformed by pressing up to the other surface of the gasket in accordance with the size and position of the cylinder bores but also deformed radially to form a cylindrical bore grommet. During packaging to the engine, like the fifth embodiment of the present invention, electric insulating members are used in combination to provide insulation between the gasket and each of the cylinder head and cylinder block.

Figure 9:
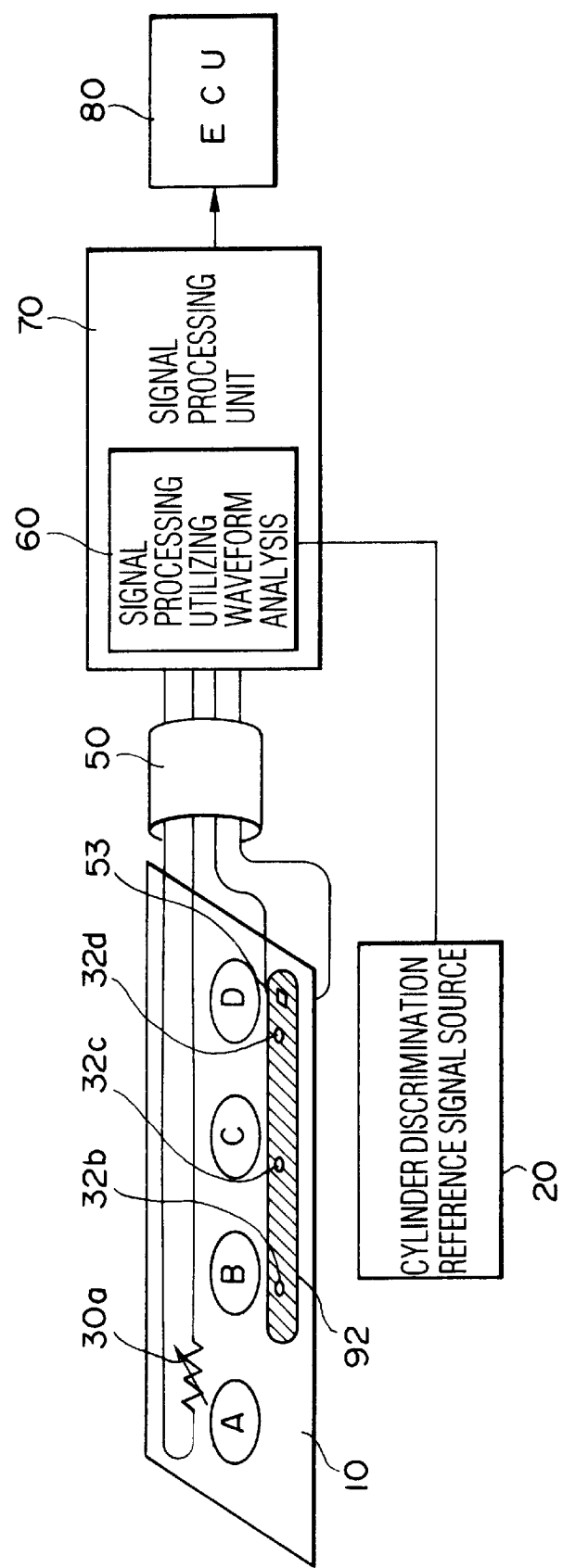
FIG. 9 is a diagram showing the circuit construction of an in-cylinder pressure sensor according to a seventh embodiment of the present invention.

Referring to FIG. 9, there is illustrated a seventh embodiment of the present invention. In the present embodiment, internal pressures of all cylinders are not picked up in the form of an overlapped signal but an internal pressure of a particular cylinder is accurately picked up by means of a separate sensor and reflected in the signal processing. A pressure sensor 30a (a metal strain gauge in the illustrated example) is adapted to detect an internal pressure of a cylinder A. On the other hand, sensing parts 32b, 32c and 32d of a distributed sensing material 92 for multipoint pressure measurement pick up changes in internal pressures of cylinders B, C and D to provide an overlapped signal. A signal from the sensor 30a can be obtained independently of the other sensor signals and hence regardless of, for example, the rotation speed and combustion state of the engine, one can easily find the signal level of atmosphere pressure or the level of standard pressure utilizing the timing when both inlet and exhaust valves open. While the output torque is calculated and controlled on the basis of a change in internal pressure of the representative cylinder A, an overlapped signal from the sensing parts 32b, 32c and 32d can also be used for performing an sensing operation which looks out over the whole cylinder such as detection of misfiring. For separation of the overlapped signal, an output signal from pressure sensor 30a per se can be used as a cylinder discrimination reference signal. Of course, a signal from the pressure sensor 30a and a signal from the crank angle sensor may be used in combination as the cylinder discrimination reference signal source 20 and the signal separation may be effected on crank rotation angle.

Figure 10:
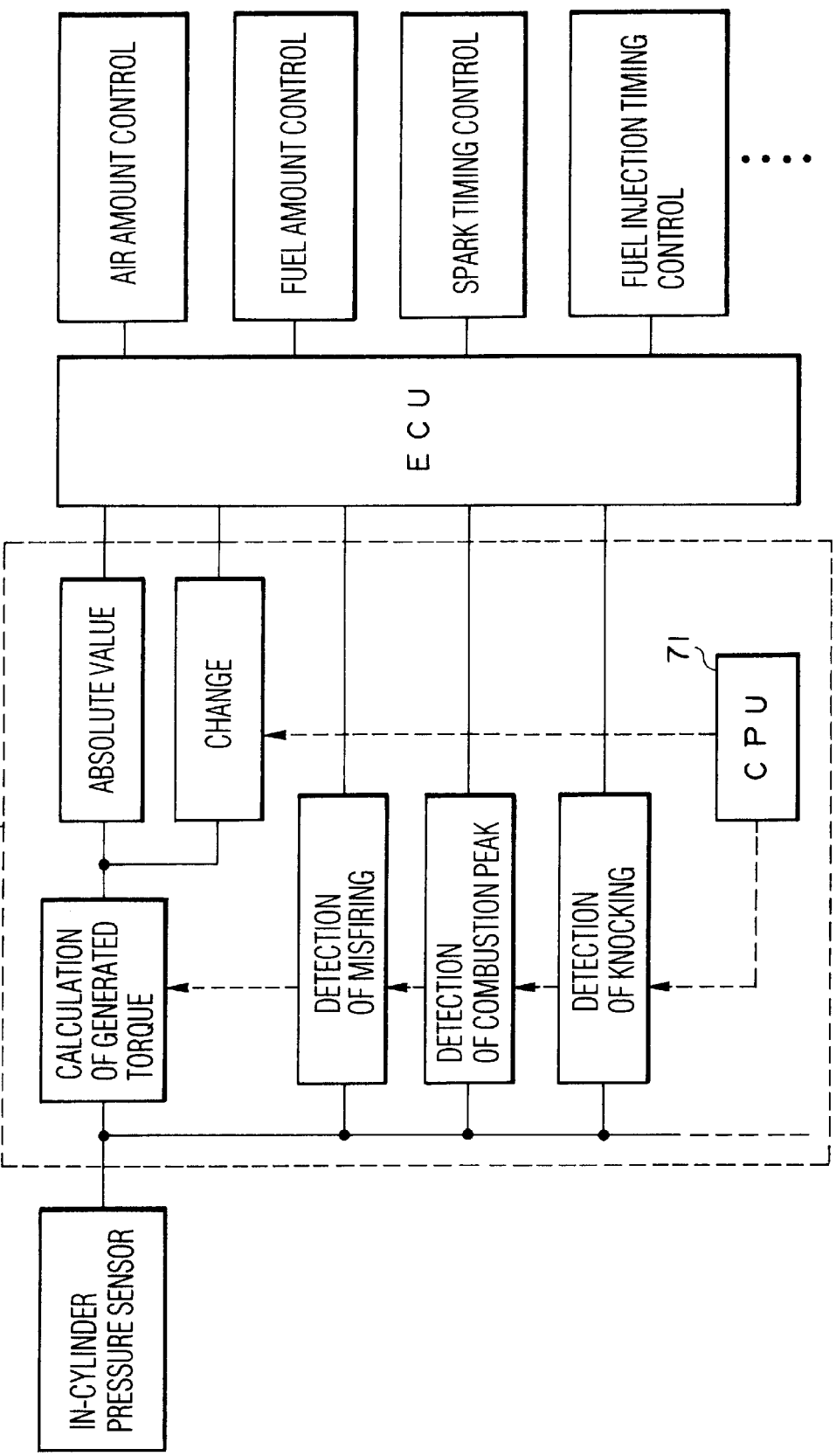
FIG. 10 is a schematic block diagram of an engine control apparatus based on the in-cylinder pressure sensor of the present invention.

Referring now to FIG. 10, an engine control system using an in-cylinder pressure sensor of the present invention is schematically shown. On the basis of a change in internal pressure of each cylinder separated from an overlapped signal of the in-cylinder pressure sensor through the signal processing utilizing a waveform analysis, the magnitude and the change amount of generated torque, the presence or absence of misfiring, the combustion peak position and the presence or absence of knocking, for example, can be detected.

Generated torque can be calculated from a change in internal pressure and a change in cylinder volume. Not the whole of a change in internal pressure but a limited change in internal pressure at combustion peak or about the center of the combustion peak may be noticed. Because the generated torque has a strong correlation with the combustion peak value and can therefore be presumed therefrom.

Similarly, a change in internal pressure near the combustion peak can be noticed to determine the presence or absence of misfiring in each cylinder. For example, a comparison can be made to a waveform indicative of only cranking obtained by integrating changes in internal pressure on crank angle, i.e., a waveform indicative of the absence of combustion in order to determine misfiring. Alternatively, when the value of combustion peak is compared with a reference threshold value, a thus obtained magnitude relation can be used to determine misfiring.

Also, when a peak of pressure is determined, a combustion peak position referenced to the spark timing can be determined on crank angle. It is generally known that optimum combustion of engine can be effected by controlling the peak position.

Further, by differentiating an obtained signal waveform or separating a specified frequency component through a direct filter processing, the presence or absence of a weak high frequency component (knocking) of, for example, 5 kHz to 20 kHz can be confirmed.

By selecting or combining various kinds of information as above as necessary, fine engine control based on the conventional method can be carried out for each engine. For example, on the basis of the value of generated torque and the misfiring information, the amounts of air and fuel or the ratio therebetween can be feedback-controlled such that necessary combustion can be maintained for a cylinder suffering a large change in torque or a cylinder suffering a high frequency of misfiring. Also, on the basis of information on the combustion peak position and knocking, the spark timing and the fuel injection timing can be controlled on real time base such that proper combustion can be maintained.

In the in-cylinder pressure sensor of the present invention and the engine control system using the sensor described as above, it is first intended to facilitate packaging of the multipoint sensing parts to the engine by collectively taking out signals from the multipoint sensing parts through a small number of signal wiring lines and then separating the signals through the signal processing. But when, in the signal processing, a signal waveform processing in a collective software fashion, for example, is employed in place of the cylinder discrimination gating processing based on direct modulation of light source, engine control for the highly general purpose can be effected which can flexibly attend to selection and change of noticed detection information.

In FIG. 10, reference numeral 70 designates a signal processing unit including a waveform analysis. The signal processing unit 70 has a CPU 71 which operates to perform the waveform analysis and signal processing of an overlapped signal from the in-cylinder pressure sensor. The operation of the CPU is executed in accordance with a flow of FIG. 12.

Figure 12:
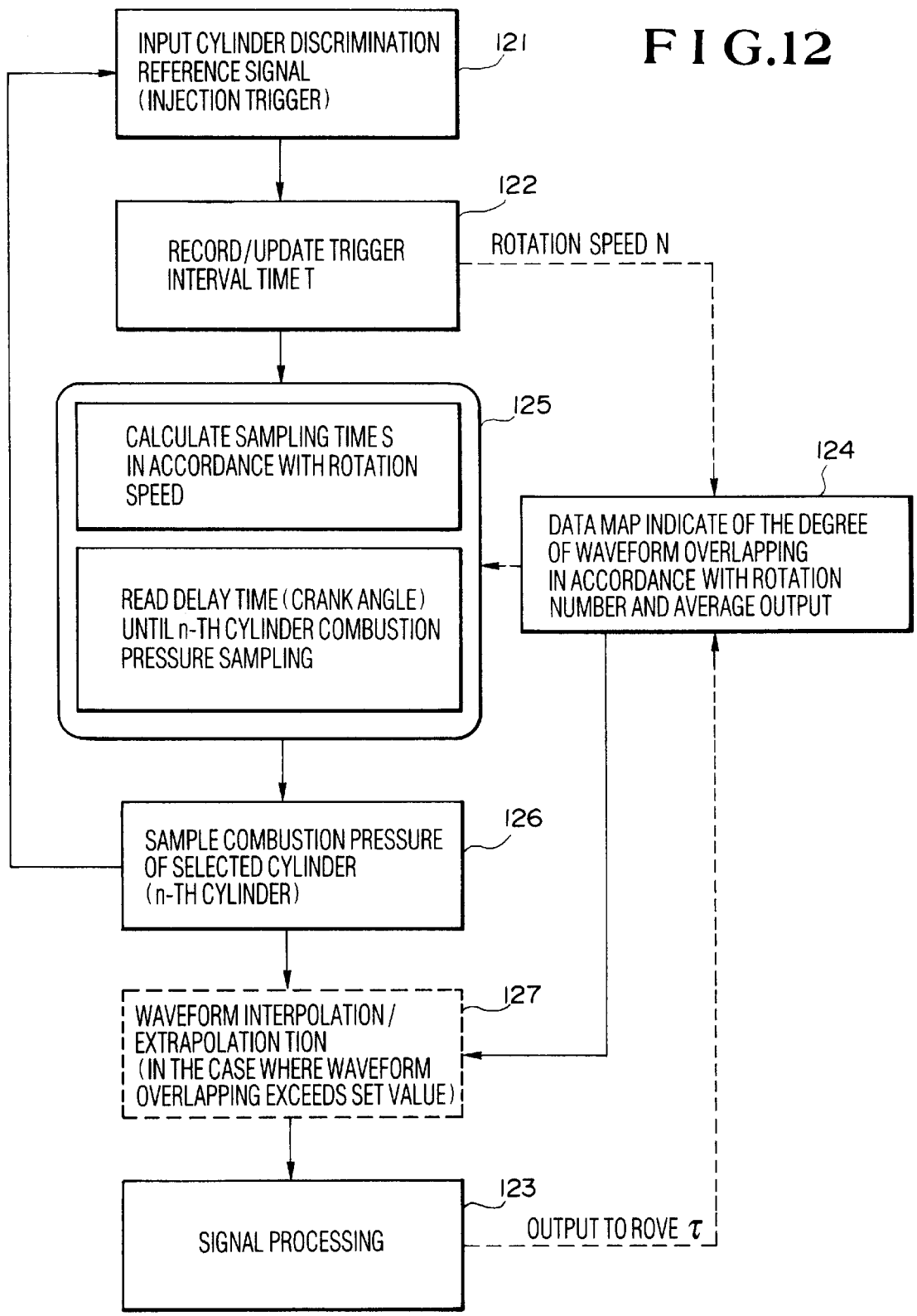
FIG. 12 is a flow chart showing an example of the operation of the embodiment shown in FIG. 10.
Figure 13:
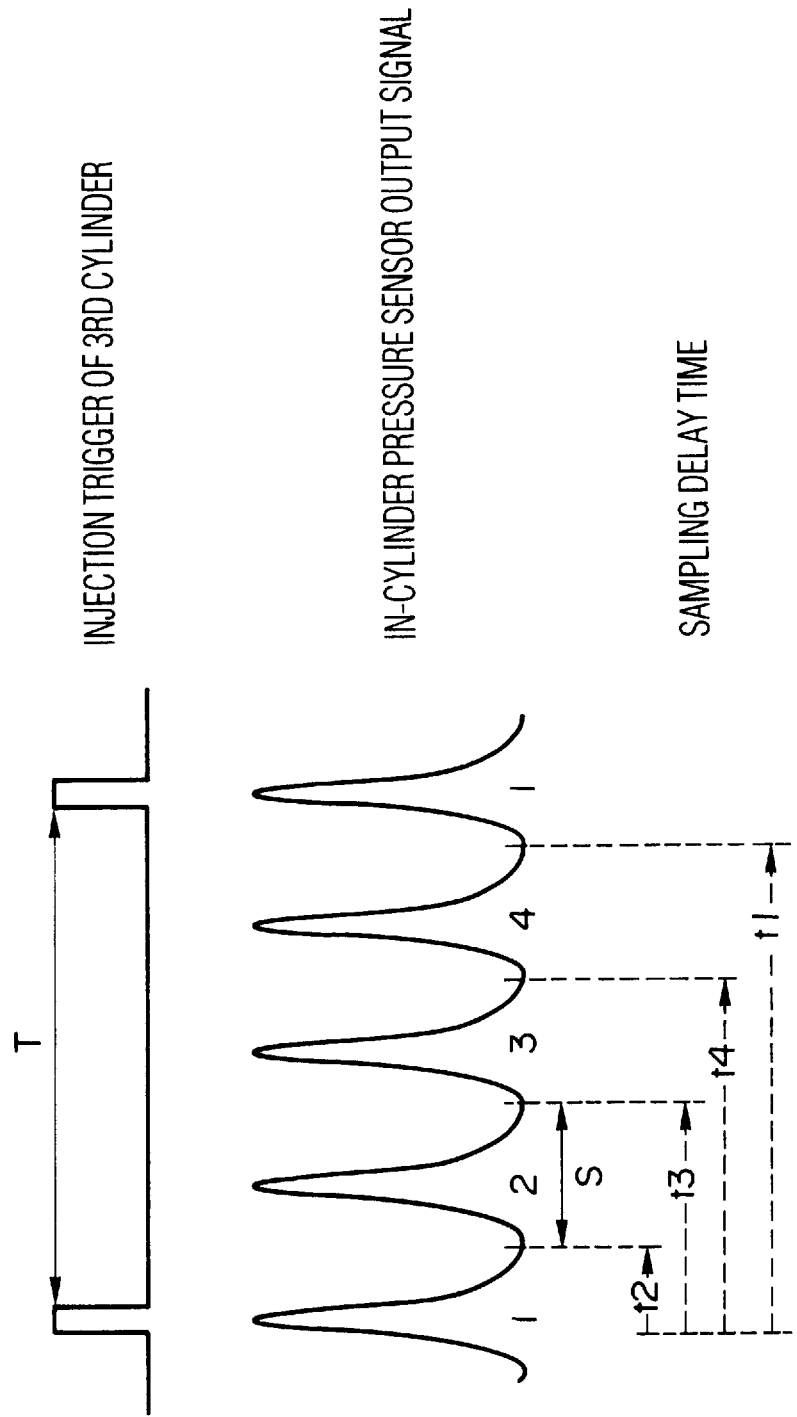
FIG. 13 is a waveform diagram for explaining the operation in a step in the flow chart of FIG. 12.

Referring to FIG. 12, a cylinder discrimination reference signal is fetched in step 121. In this embodiment, an injection trigger for the third cylinder is used as the reference signal as shown in FIG. 13. The injection trigger for the third cylinder coincides with the spark combustion timing of the first cylinder and so coincides with a detection time point of a peak signal associated with the first cylinder included in an output signal from the in-cylinder pressure sensor.

In step 122, a time interval T between the first trigger fetched in step 121 and the proceeding trigger is calculated, a rotation speed N is calculated on the basis of the time interval, and the rotation speed is recorded on a memory with the recorded contents being updated constantly.

On the other hand, in step 123, engine torque is calculated pursuant to a method to be described later and delivered. In step 124, a data map stored in a ROM is consulted on the basis of the rotation speed N from step 122 and the torque τ from step 123, and in step 125, a sampling time S complying with a rotation speed N and a delay time t1, t2, t3 or t4 until a sampling start point for a combustion pressure signal associated with a corresponding cylinder are read. Then, in step 126, the overlapped signal from the in-cylinder pressure sensor is sampled during a sampling time beginning with the read sampling start point and is stored in the memory. In step 127, data sampled in step 126 is subjected to waveform correction when adjacent peaks overlap each other to a great extent.

Figure 14:
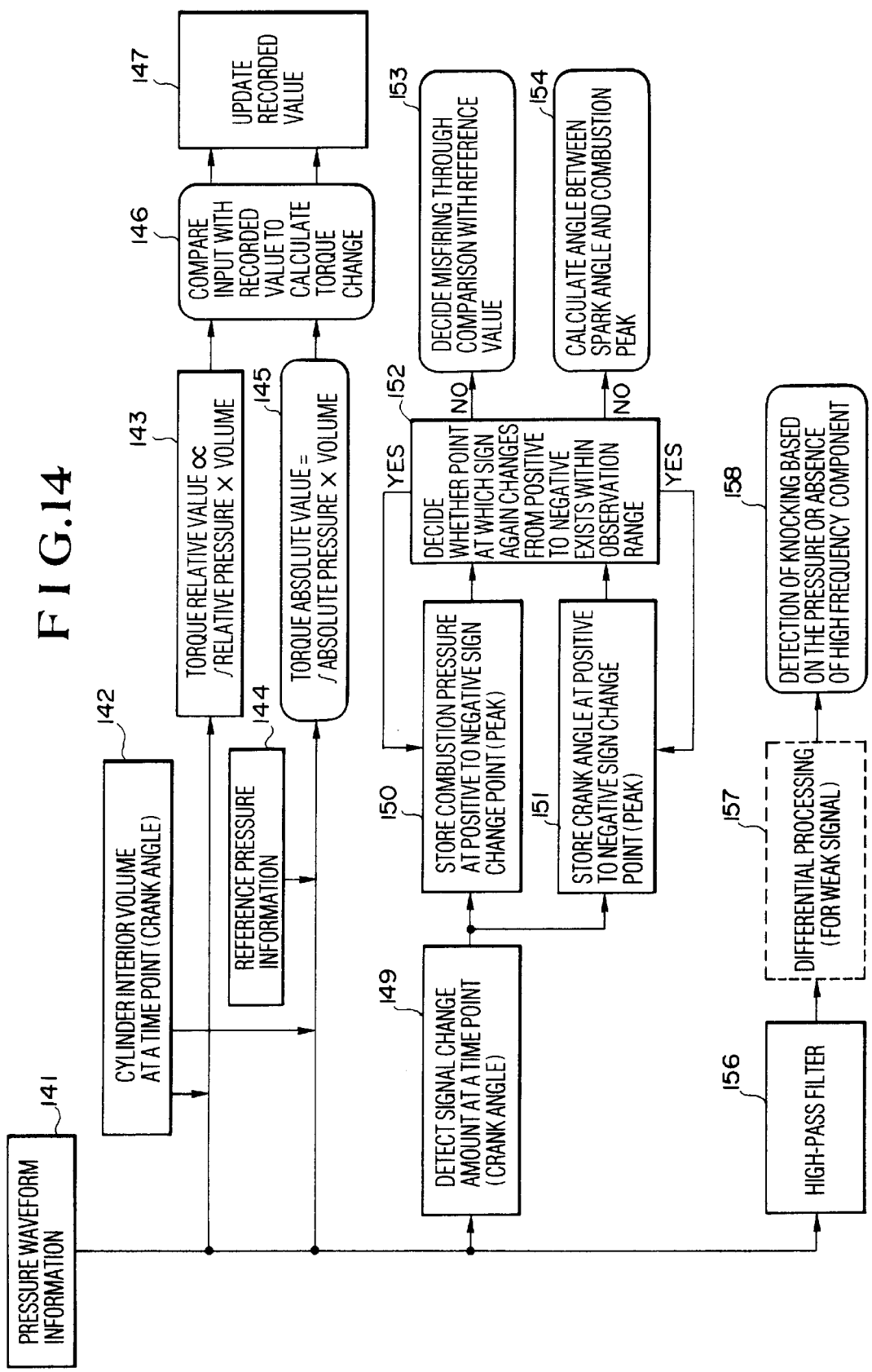
FIG. 14 is a flow chart showing details of the operation in the essential step in the flow chart of FIG. 12.

FIG. 14 is a flow chart showing details of the operation contents of step 123 in FIG. 12.

Referring to FIG. 14, in step 141, pressure waveform information obtained in step 126 or 127 of FIG. 12 is fetched. In step 142, a volume of the cylinder at a time point that each pressure data is generated is calculated and in step 143, the product of the pressure data and the volume is calculated and integrated over one cycle to calculate a torque relative value. In step 144, reference pressure information such as atmosphere pressure is read and each pressure data is converted into an absolute pressure, and in step 145, the product of the absolute pressure and the volume is calculated and integrated over one cycle to calculate a torque absolute value. Then, in step 147, the torque relative value and torque absolute value calculated in steps 143 and 145 and a change in torque calculated in step 146 are recorded for the purpose of updating.

In step 149, the gradient of the pressure signal is decided as to whether to be positive or negative by using a difference signal between preceding and succeeding input pressure data pieces, pressure data at a point where the decided sign changes from positive to negative, i.e., at a peak point of pressure waveform is recorded on the memory in step 150 and a crank angle position at that time is recorded on the memory in step 151. Then, in step 152, it is decided whether peak detection is again effected during observation of the pressure data and when a second occurrence of a peak is detected, the steps 150 and 151 are commanded to record the second peak as actual peak. Two peaks occur due to the fact that when the combustion timing is delayed, a peak due to compression and a succeeding combustion peak take place.

In step 153, it is decided whether the combustion peak value detected in step 150 is smaller than the reference value, thus determining the presence or absence of misfiring. Then, in step 154, an angle between a spark angle and a combustion peak is calculated on the basis of the crank angle detected in step 151 and is recorded and updated.

In step 156, a high-pass filter action is applied so that a high frequency component in the waveform of the pressure data is passed. As a result, a frequency component of 5 to 20 kHz standing for a knocking frequency is detected. In step 157, the detected frequency component is differentiated so that even a component of small amplitude can be detected, and in step 158, the presence or absence of knocking is determined from the differential signal.

According to the embodiments set forth so far, the in-cylinder sensor is formed of a distributed sensing material for multipoint pressure measurement such as a wire with electric resistance, pressure sensitive conducting rubber, carbon pile or an optical fiber and at least part of signals from the individual sensing parts are collectively taken out in the form of an overlapped signal, thereby ensuring that the number of signal wiring lines necessary for the neighborhood of the sensing parts can be decreased.

Also, in packaging to an engine, the sensing material along with peripheral signal wiring lines is packaged between the engine cylinder head and the cylinder block, especially, packaged integrally with the head gasket, so that regardless of conditions of the neighborhood of engine where a sensor packaging space is difficult to maintain, packaging of the in-cylinder pressure sensor for multi-cylinder pressure measurement can be facilitated.

Further, the separation of the overlapped signal is effected in a software fashion by using the reference signal source for cylinder discrimination and the signal processing unit including a signal processing utilizing a waveform analysis, so that selection and change of detection information in question can be dealt with flexibly without changing the apparatus construction which directly affects the packaging surface.

By virtue of the above effects and the combination thereof, in the in-cylinder pressure sensor of the present invention and the engine control system using the sensor, signals from a plurality of sensing parts can collectively be taken out through a small number of signal wiring lines and thereafter an overlapped signal can be separated through the signal processing, thereby facilitating the engine control based on the multi-cylinder pressure measurement.

Next, an optical fiber in-cylinder pressure sensing apparatus for multi-cylinder pressure measurement will be described in which one end of a gasket incorporating optical fiber in-cylinder pressure sensor is utilized as an end for reflection of light so that a light incident end of an optical fiber may also serve as a detection end, and a light emitting unit and a light receiving unit are packaged close to each other, whereby electrical wiring connected to the outside of an engine can be simplified and unwanted optical fiber wiring inside a gasket can be eliminated.

Figure 15:
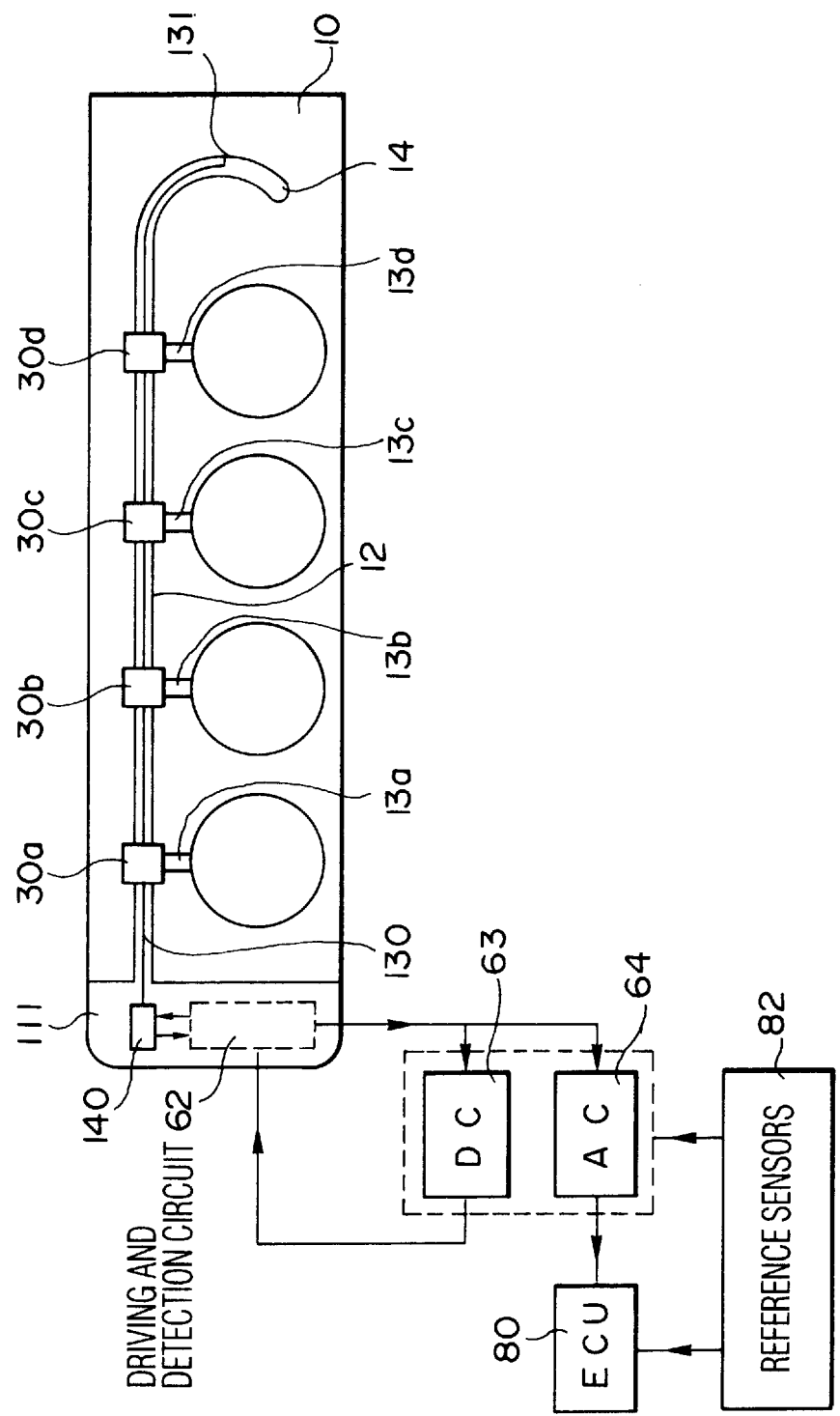
FIG. 15 is a diagram showing the overall construction of an in-cylinder pressure sensor using an optical fiber according to the present invention.

Referring to FIG. 15, there is illustrated an embodiment of the present invention. In the figure, reference numeral 10 designates an engine head gasket or a plate-like structure corresponding to the head gasket. A light emitting unit and a light receiving unit are collectively packaged to the gasket 10 and a supporter 111 is provided to the gasket 10 to fix a light emitting and receiving unit 140. As an example, the supporter 111 can be formed by slightly projecting a metal plate used for constituting the gasket 10 from an edge thereof. The necessary electrical circuits are packaged onto the supporter and enclosed with a cover. In an alternative, a box-like member may be attached to the edge of the gasket. In any case, the size of the supporter 111 can be selected so as not to disturb installation of the sensing gasket.

The light emitting and receiving unit 140 is optically connected with an optical fiber 130 and the optical fiber is packaged into a groove 12 formed in the gasket 10. The outer diameter of the optical fiber, covered with a protection coating, is about 0.3 mm and the optical fiber can sufficiently be packaged within the gasket having a thickness of 1 mm or less. The optical fiber 130 passes through sensing parts 30a to 30d to which internal pressures of individual cylinders are introduced through the pressure introducing paths 13a to 13d, making each sensing part of the optical fiber undergo a bend in accordance with an internal pressure.

A reflection end surface 131 of the optical fiber is formed of a vertical cut of the optical fiber. This permits part of light to be reflected at the vertical end surface 131 and thereafter to return to the light emitting and receiving unit 140. As an example, the vertical end surface 131 is subjected to vacuum evaporation or plating of, for example, metal to ensure steady reflection. As described above, the optical fiber 130 undergoes a loss of light in accordance with a bend of each of the sensing parts 30a to 30d and so a change in internal pressure can be measured from the magnitude of the loss. In the present embodiment, light passes twice through each sensing part at a speed which is sufficiently faster than the rate of combustion cycle and consequently, the optical fiber undergoes a loss of light in accordance with an instantaneous internal pressure with doubled sensitivity. Therefore, even when the bending capability of the optical fiber necessary for the individual sensing parts is degraded to make the optical characteristics less change with a change in internal pressure, the sensitivity can remain unchanged. Accordingly, bending load imposed on the optical fiber can be mitigated to promote the durability of the optical fiber.

In the figure, the groove 12 is made to be slightly longer than the optical fiber. Namely, the groove has a surplus room 14 for the optical fiber. Being different from an electric wire, an optical fiber, when it is cut too short or broken for some reasons, is not easy to recover a longer scheduled length by connecting another optical fiber. More particularly, for recovery of the scheduled length, the short optical fiber has to be connected with a fresh optical fiber by fusing such that exact transmission of light can be permitted through the connection. Accordingly, an optical fiber to be handled must have a surplus length and a structure for absorbing unevennesses of the surplus length is needed. In the figure, such irregularity is adjusted by the length of the groove formed in the gasket. Obviously, the surplus room 14 is not always an extension of the groove but may be a suitably provided space.

In the figure, reference numeral 62 designates a driving and detection circuit for the module 140 provided on the supporter 111. By prolonging electrical wiring between the detection circuit 62 and the light emitting and receiving unit 140, the detection circuit 62 can of course be disposed remotely from the engine body. In this case, the area of the supporter 111 can be smaller. An output signal from the detection circuit contains a DC component unchangeable with the combustion cycle and an AC component (combustion pressure signal component) changeable with a change in internal pressure. In the figure, the output of the light source is adjusted on the basis of the magnitude of a DC component detected and processed by a signal DC component detecting and processing unit 63 and the engine control is effected by an engine control unit 80 as described with reference to FIGS. 10 to 14 on the basis of an output of a reference sensor 82 and the state of a waveform indicative of a change with time in internal pressure (or a change in internal pressure taken on crank rotation angle) detected by a signal AC component (internal pressure signal) detecting and processing unit 64.

Of course, when more accurate detection of internal pressure of each cylinder is desired, one system of the signal wiring as above is required to be changed to two or more signal wiring systems to meet a situation. The optical fiber in-cylinder pressure sensor of the present invention is easy to meet the above situation as compared to the conventional fiber-optic sensors.

Figure 16:
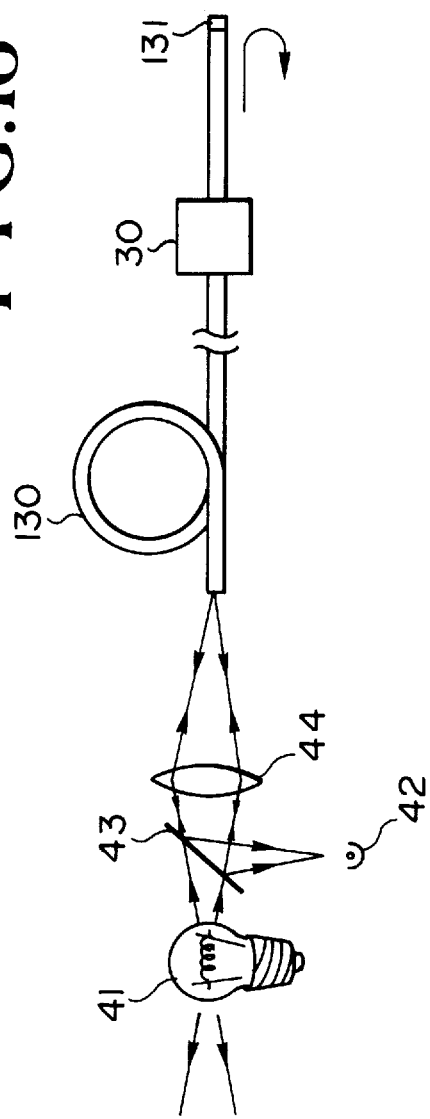
FIGS. 16 to 19 are diagrams showing examples of light emitter and light receiver which are constructed differently in the embodiment shown in FIG. 15.

Referring now to FIG. 16, an example of construction of the light emitting and receiving unit 140 according to the present invention. In the figure, reference numeral 43 designates light splitter (half mirror) and 44 a light collector (lens). Light emitted from a general light emitter 41 is incident on an optical fiber and part of returning light reflected at an optical fiber reflection end surface 131 is split by the light splitter 43 and measured by a light receiver 42. The optical fiber 130 having the optical fiber reflection end surface 131 and a sensing part 30 are packaged in the engine head gasket.

Figure 17:
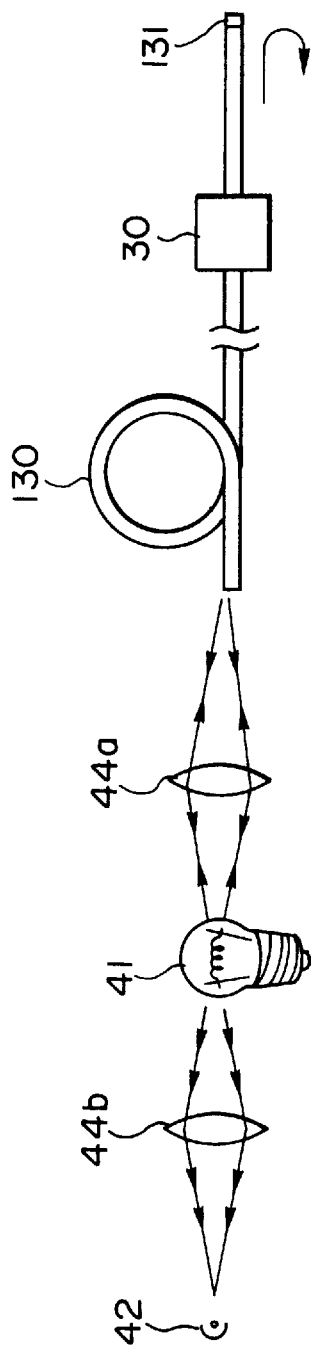

FIG. 17 shows another example of construction of the light emitting and receiving unit 140. As shown in FIG. 17, reflected returning light having passed through a light emitter 41 is detected by a light receiver 42.

Figure 18:
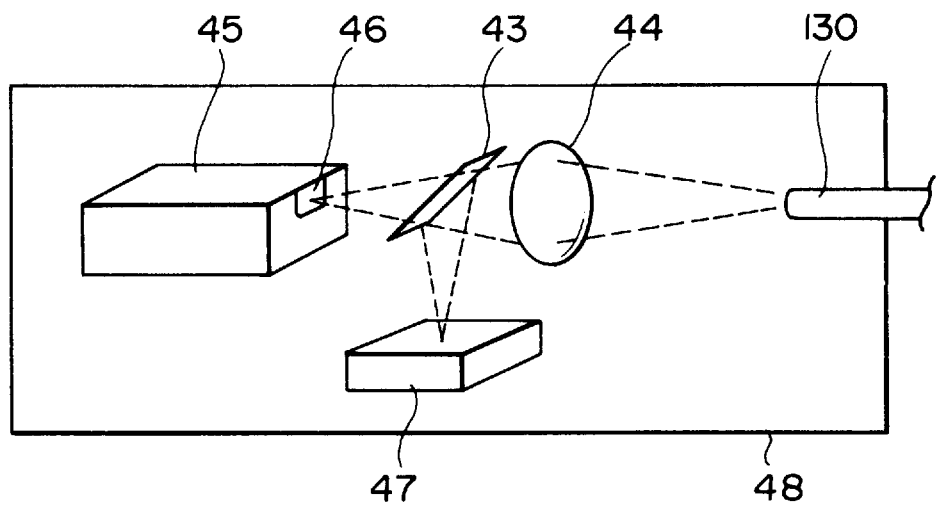

FIG. 18 is still another example of construction of the light emitting and receiving unit 140 in the form of a small module. In the figure, a light emitting device 45 such as a laser diode or a superluminescent diode is used as the light emitter and a light receiving device 47 represented by a photodiode is used as the light receiver. Since the light emitting device 45 and light receiving device 47 are small in size and therefore, they are packaged, along with a half mirror 43 standing for a light splitter and a lens 44, in a small module frame to form a light emitting and receiving module 48. Various kinds of lens such as for example a cylindrical lens and a ball lens can be used as the lens 44. An optical fiber 130 is positioned in relation to the light emitter and lens 44 which are fixed to the light emitting and receiving module 48 forming the module frame and the optical fiber is fixed to the module frame. Although not illustrated in the figure, a separate ferrule-like member for enclosing the optical fiber may precedently be prepared as a fixing unit for the optical fiber 130, thereby making fixing of the optical fiber to the module frame easy and steady.

Figure 19:
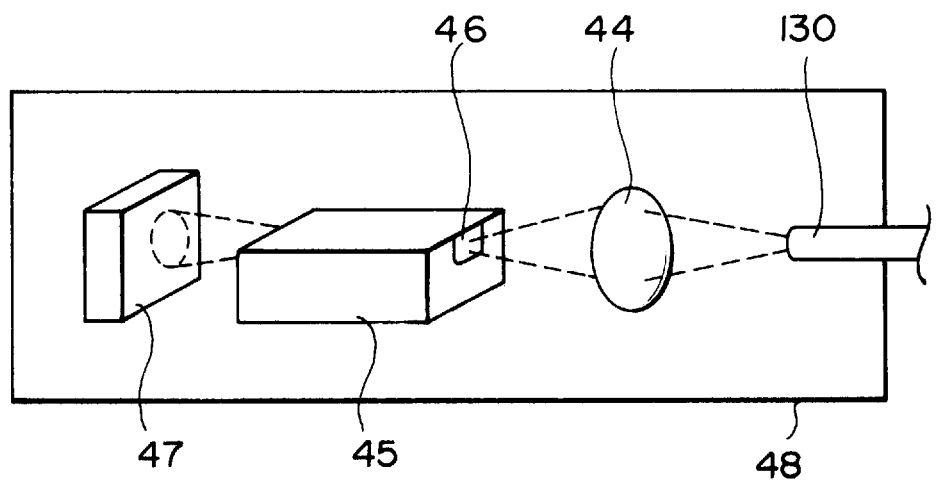

FIG. 19 shows still another example of construction of the light emitting and receiving unit 140 in the form of a small module. In the figure, reference numeral 46 designates an active region of a light emitting device 45, that is, a light emitting portion of the light source. The active region takes the form of an optical wave guide which has an opening in the opposite surface of the light emitting device. As shown in the figure, reflected returning light having passed through the active region 46 is detected by a light receiving device 47. Generally, the light receiving area of the light receiving device 47 is larger than the opening of the active region 46 and hence a collecting lens is not provided in association with the light receiving device. Some of general-purpose laser diode modules incorporate in advance a light source monitoring photodiode corresponding to the light receiving device 47 shown in the figure and in this case, an in-cylinder pressure signal can be detected directly from an output of the monitoring photodiode. Of course, a light collector collecting light to an optimum position of the light receiving device 47 can also be used.

The light receiving device 47 receives an in-cylinder pressure change signal from the sensing optical fiber, together with direct reception of light of light source radiated from the back of the light emitting device 45. The in-cylinder pressure detection signal mainly contains an AC component in accordance with the combustion cycle. Similarly, knocking due to abnormal combustion can be obtained from signal with higher frequencies. Contrary to this, light of the light source can be detected essentially in the form of a DC component. Accordingly, by detecting the in-cylinder pressure signal standing for the AC component while controlling the light source output such that the DC component is kept to be constant through, for example, the signal processing shown in FIG. 15, internal pressure measurement capable of suppressing a scale factor change of signal can be carried out. Of course, an intensity modulated component is contained in the light emitting intensity of the light emitting device 45 but the influence of this component is small when a sufficient in-cylinder pressure signal intensity can be obtained from the reflected returning light.

Generally, when passing through the active region 46, the reflected returning light undergoes light amplification in accordance with a structure of the active region acting as a resonator. When the ratio of the light amplification greatly changes with, for example, a small change in injection current of the light emitting device 45, it is expected that this great change so affects the signal detection as to make it unstable. In this case, the influence can be decreased by decreasing the reflection factor of the facet of the active region 46. Alternatively, similar effects can be expected by setting the injection current of the light emitting device to a region which is sufficiently smaller than the threshold of laser oscillation.

Figure 20:
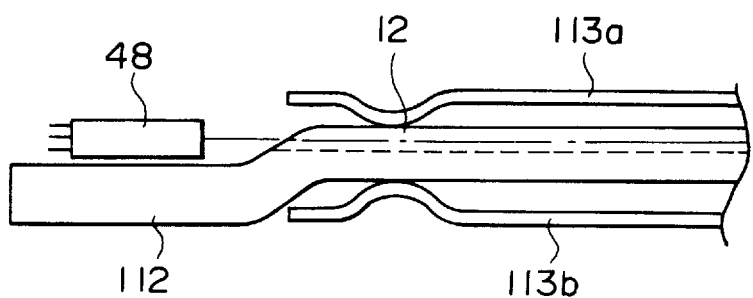
FIGS. 20 to 22 are diagrams showing different forms of the light emitter and light receiver in the embodiment shown in FIG. 15.

FIG. 20 shows an example of construction of the supporter of the embodiment shown in FIG. 15. Packaging of a sensor within a sensor packaging metal plate 112 which is formed by laminating metal plates and which also serves as an intermediate plate of the metal gasket is illustrated in sectional form in FIG. 20. In addition to a groove 12 for optical fiber packaging, a space for packaging sensing parts and internal pressure introducing conduits can be formed in the metal plate 112. In the figure, reference numerals 113*a* and 113*b* designate metal plates for enhancing the internal pressure sealing effect. Of course, the number of the internal pressure sealing metal plates 113*a* and 113*b* is not limited to two.

Figure 21:
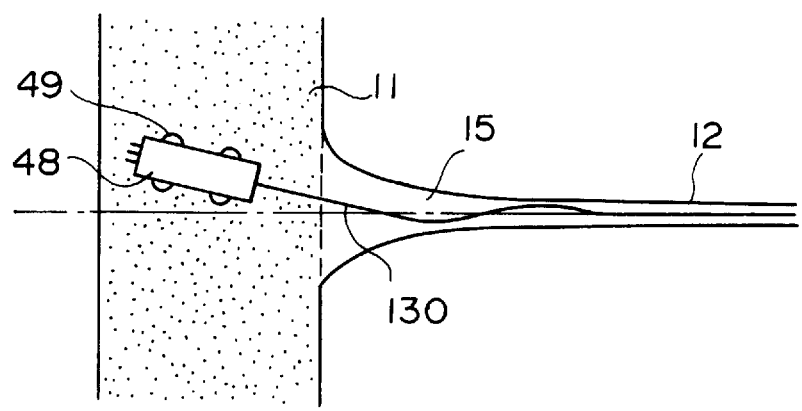

FIG. 21 shows an example of packaging of the light emitting and receiving module to the supporter. In the figure, there are illustrated an arrangement of a light emitting and receiving module 48 fixed to the surface of the gasket by means of a fixer 49 and an optical fiber 130. As described hereinbefore, a supporter 111 can be made of the same material as that of the optical fiber packaging portion.

Generally, it is difficult for the optical fiber 130 to freely move in an optical fiber path 12 in the form of a groove formed in the gasket. Accordingly, when the material constituting the gasket, for example, the metal plate is thermally deformed to expand or contract, tension takes place conceivably between the optical fiber and the light emitting and receiving module 48 fixed externally to increase structural load imposed on the optical fiber. To cope with this problem, the width of the groove is widened near the outlet of the optical fiber as illustrated to provide a portion utilized as an optical fiber length adjuster 15. Thus, the optical fiber can be slightly slackened in the optical fiber length adjuster 15 to mitigate the influence of tension caused by thermal expansion. Of course, structures similar to the optical fiber length adjuster 15 can be provided at a plurality sites in the gasket. Generally, a similar effect can be expected by widening the width of the optical fiber groove at a portion other than such portions as the proximity of the sensing parts where the position of the optical fiber is specified in relation to pressure receiving members such as diaphragms.

Further, as illustrated in the figure, with a view of mitigating the load on the connection part between the light emitting and receiving module 48 and the optical fiber, the light emitting and receiving module is packaged obliquely to a direction of extension line of the optical fiber path 12 standing for the gasket groove. Of course, in the case where the structural load on the light emitting and receiving module can be decreased by slackening the optical fiber, the light emitting and receiving module may be packaged in the extension direction of the optical fiber groove.

Figure 22:
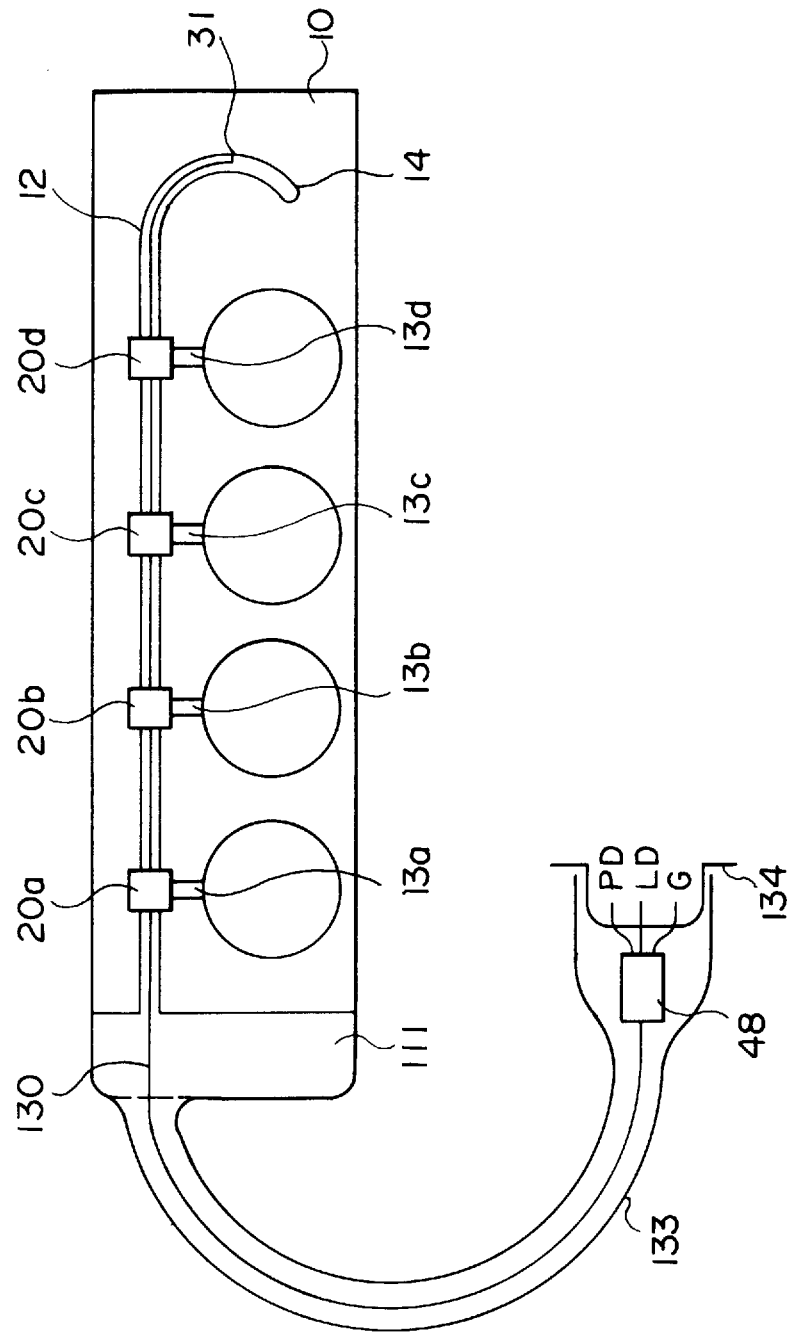

Referring to FIG. 22, there is illustrated still another embodiment of the present invention. In the figure, the number of electrical wiring lines in the neighborhood of the engine is decreased by mounting an optical fiber cable 133 to a supporter 111. In the engine surroundings, electrical noise due to, for example, discharge of spark plug is large. Accordingly, in addition to the sensing parts in the engine, the detection signal line is desired to be formed, as far as possible, of an optical fiber immune from the electrical noise. In the figure, reference numeral 48 designates a light emitting and receiving module and 134 a connector to the detection circuit. In the present embodiment, the light emitting and receiving module can be packaged remotely from the engine standing for a heat source and can easily be avoided from being affected thermally.

According to the embodiment of the fiber-optic cylinder pressure sensor described as above, by using reflected returning light from the tip end of the optical fiber packaged within the engine gasket as an object to be detected, wiring of the optical fiber to be laid in the gasket can be changed freely while disposing the light receiver near the light emitter optically connected to the optical fiber.

Further, by detecting the reflected returning light and light directly from the light emitter at a time, for example, by detecting the reflected returning light having passed through the light emitter, the light emitter and the light receiver can be packaged close to each other.

Further, by using a light emitting device represented by a laser diode as the light emitter and a light receiving device represented by a photodiode as the light receiver, the light emitter and the light receiver can be packaged in combination in a small module. In a combination with the above optical system, a monitoring photodiode built in a general-purpose laser diode module, for example, can be used by itself for detection of the reflected returning light.

As described as above, when designing the gasket incorporating fiber-optic cylinder pressure sensor, the light incident end of the optical fiber is also used as the light detection end by utilizing reflection of light and packaging the light emitter and the light receiver close to each other, the electric wiring connected to the outside of the engine can be simplified and at the same time, unwanted optical fiber wiring in the gasket can be eliminated. As a result, a fiber-optic cylinder pressure sensor for multi-cylinder pressure measurement easily adaptable to various kinds of engines and various kinds of gaskets can be provided.

We claim:

1. An in-cylinder pressure sensing apparatus for a multi-cylinder engine comprising:
   a plurality of sensing parts packaged between a cylinder head and a cylinder block of an engine having a plurality of cylinders and being operative to detect a signal indicative of an internal pressure of each of the plurality of cylinders;
   a detection circuit for taking out detection signals obtained from at least two of said sensing parts as a resulting overlapped signal;
   reference signal generating means operative to supply a reference signal for discriminating the detection signals obtained in association with said plurality of cylinders; and
   means for separating at least one of the detection signals, detected by said at least two sensing parts to provide the overlapped signal, from said overlapped signal on the basis of said reference signal.

2. An in-cylinder pressure sensing apparatus according to claim 1, wherein the plurality of sensing means electrically detect a signal indicative of an internal pressure of each of the plurality of cylinders.

3. An in-cylinder pressure sensing apparatus for a multi-cylinder engine according to claim 1, wherein at least part of a signal wiring line interconnecting said sensing parts is packaged within a gasket.

4. An in-cylinder pressure sensing apparatus for multi-cylinder engine according to claim 3, wherein at least part of the signal wiring line interconnecting said sensing parts is made of the same material as that comprising said sensing parts.

5. An in-cylinder pressure sensing apparatus for a multi-cylinder engine according to claim 4, wherein the material comprising said sensing parts is a pressure sensitive optical fiber.

6. An in-cylinder pressure sensing apparatus for a multi-cylinder engine according to claim 4, wherein the material comprising said sensing parts is pressure sensitive conducting rubber.

7. An in-cylinder pressure sensing apparatus for a multi-cylinder engine according to claim 4, wherein the material comprising said sensing parts is a material which changes in its electric resistance with a change in its shape.

8. An in-cylinder pressure sensing apparatus for a multi-cylinder engine according to claim 4, wherein the material comprising said sensing parts is a pressure sensitive seal material.

9. An in-cylinder pressure sensing apparatus according to claim 8, wherein said pressure sensitive seal material is comprised of electrically conductive particles distributed in carbon pile.

10. An in-cylinder pressure sensing apparatus according to claim 8, wherein said pressure sensitive seal material is comprised of electrically conductive particles distributed in heat resistant rubber.

11. An in-cylinder pressure sensing apparatus for a multi-cylinder engine comprising:
    a plurality of sensing parts packaged between a cylinder head and a cylinder block of an engine having a plurality of cylinders and being operative to detect a signal indicative of an internal pressure of each of the plurality of cylinders;
    a detection circuit for taking out detection signals obtained from at least two of said sensing parts as a resulting overlapped signal;
    reference signal generating means operative to supply a reference signal for discriminating the detection signals obtained in association with said plurality of cylinders; and
    means for separating at least one of the detection signals, detected by said at least two sensing parts to provide the overlapped signal, from said overlapped signal on the basis of said reference signal, wherein said sensing parts are packaged within an engine head gasket.

12. An in-cylinder pressure sensing apparatus according to claim 11, wherein the plurality of sensing means electrically detect a signal indicative of an internal pressure of each of the plurality of cylinders.

13. An in-cylinder pressure sensing apparatus for a multi-cylinder engine according to claim 11, wherein at least part of a sealing material and a metal bore grommet of said gasket is used as said sensing parts.

14. An in-cylinder pressure sensing apparatus for multi-cylinder engine according to claim 13, further comprising insulating means for electrically insulating said gasket from said cylinder head or said cylinder block.

15. An in-cylinder pressure sensing apparatus for a multi-cylinder engine according to claim 14, wherein said insulating means is an insulating layer provided on at least one of top and bottom surfaces of said gasket.

16. An in-cylinder pressure sensing apparatus for a multi-cylinder engine according to claim 11, wherein at least part of a sealing material and a metal bore grommet of said gasket is used as a signal wiring line for said sensing parts.

17. An in-cylinder pressure sensing apparatus for a multi-cylinder engine according to claim 16, wherein at least one of said sensing part and said signal wiring line is made of pressure sensitive conducting rubber.

18. An in-cylinder pressure sensing apparatus for a multi-cylinder engine according to claim 16, wherein at least one of said sensing part and said signal wiring line is made of a material which changes in its electric resistance with a change in its shape.

19. An in-cylinder pressure sensing apparatus for a multi-cylinder engine according to claim 16, wherein at least one of said sensing part and said signal wiring line is made of pressure sensitive seal material.

20. An in-cylinder pressure sensing apparatus according to claim 19, wherein said pressure sensitive seal material is comprised of electrically conductive particles distributed in carbon pile.

21. An in-cylinder pressure sensing apparatus according to claim 19, wherein said pressure sensitive seal material is comprised of electrically conductive particles distributed in heat resistant rubber.

22. An in-cylinder pressure sensing apparatus for a multi-cylinder engine comprising:
- an optical fiber having one end formed into an end surface for reflecting light;
- light emitting means for introducing light into said optical fiber from the other end thereof;
- light receiving means for detecting light introduced from said light emitting means into the other end of said optical fiber and reflected at said end surface so as to be radiated from the other end;
- means for arranging said optical fiber such that said optical fiber undergoes a local bend due to an internal pressure of each cylinder at sensing parts capable of sensing internal pressures of a plurality of engine cylinders;
- a detection circuit connected to said light receiving means and being operative to overlap detection signals obtained from at least two of said sensing parts to take out a resulting overlapped signal;
- reference signal generating means operative to supply a reference signal for discriminating the detection signals obtained from said plurality of cylinders; and
- means for separating at least one of the detection signals, detected by said at least two sensing parts to provide the overlapped signal, from said overlapped signal on the basis of said reference signal.

23. An in-cylinder pressure sensing apparatus for multi-cylinder engine according to claim 22, wherein said light receiving means detects the reflected returning light and direct light from said light emitting means at a time.

24. An in-cylinder pressure sensing apparatus for a multi-cylinder engine according to claim 22, wherein said light emitting means is one of a laser diode and superluminescent diode, said light receiving means is a photodiode, and said laser diode and said photodiode are packaged within one module.

25. An in-cylinder pressure sensing apparatus for a multi-cylinder engine according to claim 22, wherein said end surface has a reflection film formed through vacuum evaporation.

26. An in-cylinder pressure sensing apparatus for a multi-cylinder engine according to claim 22 further comprising means for splitting the reflected returning light and the direct light from said light emitting means, wherein said light receiving means detects the reflected returning light split by said splitting means.

27. An in-cylinder pressure sensing apparatus for a multi-cylinder engine according to claim 26, wherein said splitting means is a half mirror.

28. An in-cylinder pressure sensing apparatus for a multi-cylinder engine according to claim 26, wherein said light emitting means is one of a laser diode and a superluminescent diode, said light receiving means is a photodiode, and said one of the laser diode and the superluminescent diode, photodiode and splitting means are package within one module.

29. An in-cylinder pressure sensing apparatus for a multi-cylinder engine according to claim 22, wherein at least part of said optical fiber is packaged in a gasket of the engine.

30. An in-cylinder pressure sensing apparatus for a multi-cylinder engine according to claim 29, wherein at least part of said optical fiber is packaged within one of metal plates comprising said gasket.

31. An in-cylinder pressure sensing apparatus for a multi-cylinder engine according to claim 30, wherein said metal plate for packaging said optical fiber has a portion extending to the outside of the engine, and said light emitting means and said light receiving means are packaged within said extension or on the surface thereof.

32. An in-cylinder pressure sensing apparatus for a multi-cylinder engine according to claim 31, wherein said light emitting means and said light receiving means are arranged obliquely to a direction of extension of said optical fiber taken out of said metal plate packaging said optical fiber.

33. A pressure sensing apparatus for a multi-cylinder engine comprising:
- an optical fiber having one end formed into an end surface for reflecting light;
- light emitting means for introducing light into said optical fiber from the other end thereof;
- light receiving means for detecting light introduced from said light emitting means into the other end of said optical fiber and reflected at said end surface so as to be radiated from the other end;
- means for arranging said optical fiber such that said optical fiber undergoes a local bend due to at least one pressure which local bend is sensed by a sensing part;
- a detection circuit connected to said light receiving means and for detecting a signal obtained from said sensing part.

* * * * *